US007913257B2

(12) United States Patent
Nishikawa

(10) Patent No.: US 7,913,257 B2
(45) Date of Patent: Mar. 22, 2011

(54) SCHEDULING METHOD, SCHEDULING APPARATUS AND MULTIPROCESSOR SYSTEM

(75) Inventor: Naohiro Nishikawa, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1512 days.

(21) Appl. No.: 11/291,073

(22) Filed: Nov. 30, 2005

(65) Prior Publication Data

US 2006/0123420 A1 Jun. 8, 2006

(30) Foreign Application Priority Data

Dec. 1, 2004 (JP) ................................ 2004-348479

(51) Int. Cl.
G06F 9/46 (2006.01)
(52) U.S. Cl. ........................................ 718/102; 718/104
(58) Field of Classification Search .................... 718/104
See application file for complete search history.

(56) References Cited

U.S. PATENT DOCUMENTS

| 5,991,793 | A  | * | 11/1999 | Mukaida et al. | ............... | 718/104 |
| 6,314,501 | B1 | * | 11/2001 | Gulick et al. | .................. | 711/153 |
| 6,675,191 | B1 |   | 1/2004  | Ito |  |  |
| 6,910,210 | B1 | * | 6/2005  | Chew | ............................ | 718/103 |
| 2004/0117790 | A1 | * | 6/2004 | Rhine | ............................ | 718/100 |
| 2004/0237087 | A1 | * | 11/2004 | Ye et al. | ........................ | 718/101 |

FOREIGN PATENT DOCUMENTS

| JP | 09-179834 | 7/1997 |
| JP | 09-274608 | 10/1997 |
| JP | 10-63525 | 3/1998 |
| JP | 2000-330807 | 11/2000 |
| JP | 3557947 | 11/2000 |

OTHER PUBLICATIONS

Notification of Reason(s) for Refusal dated Dec. 22, 2009 from the corresponding Japanese Application.
Chinese Office Action dated Jul. 11, 2008, from the corresponding Chinese Application.
Chinese Third Office Action dated Jun. 5, 2009, from the corresponding Chinese Application.
Chinese Second Office Action dated Feb. 6, 2009, from the corresponding Chinese Application.
PCT/ISA/210 International Search Report for corresponding PCT application JP2005/21663, dated Mar. 14, 2006.
PCT/ISA/237 Written Opinion of ISA for corresponding PCT application JP2005/21663, dated Mar. 14, 2006.

* cited by examiner

Primary Examiner — Emerson C Puente
Assistant Examiner — Camquy Truong
(74) Attorney, Agent, or Firm — Katten Muchin Rosenman LLP

(57) ABSTRACT

A thread status managing unit organizes a plurality of threads into groups and manages the status of the thread groups. A ready queue queues thread groups in a ready state or a running state in the order of priority and, within the same priority level, in the FIFO order. An assignment list generating unit sequentially retrieves the thread groups from the ready queue. The assignment list appends a retrieved thread group to a thread assignment list only when all threads belonging to the retrieved thread group are assignable to the respective processors at the same time. A thread assigning unit assigns all threads belonging to the thread groups stored in the thread assignment list to the respective processors.

13 Claims, 25 Drawing Sheets

| GROUP ID | NUMBER OF THREADS | STATUS | THREADS | PRIORITY LEVEL |
|---|---|---|---|---|
| 1 | 3 | RUNNING | th1a, th1b, th1c | 1 |
| 2 | 1 | RUNNING | th2a | 2 |
| 3 | 2 | READY | th3a, th3b | 2 |
| 4 | 1 | READY | th4a | 4 |

| PROCESSOR NUMBER | THREADS ASSIGNED | MARK |
|---|---|---|
| 1 | th1a | |
| 2 | th1b | |
| 3 | th1c | |
| 4 | th2a | |

| GROUP | NUMBER OF THREADS | STATUS | THREADS | PRIORITY LEVEL |
|---|---|---|---|---|
| 1 | 3 | RUNNING | th1a, th1b, th1c | 1 |
| 2 | 1 | RUNNING | th2a | 2 |
| 3 | 4 | READY | th3a, th3b, th3c, th3d | 2 |
| 4 | 1 | READY | th4a | 4 |

| GROUP | NUMBER OF THREADS | STATUS | THREADS | PRIORITY LEVEL |
|---|---|---|---|---|
| 1 | 2 | READY | th1a, th1b | 1 |
| 2 | 3 | READY | th2a, th2b, th2c | 2 |
| 3 | 1 | READY | th3a | 3 |
| 4 | 1 | READY | th4a | 4 |
| 5 | 3 | READY | th5a, th5b, th5c | 5 |

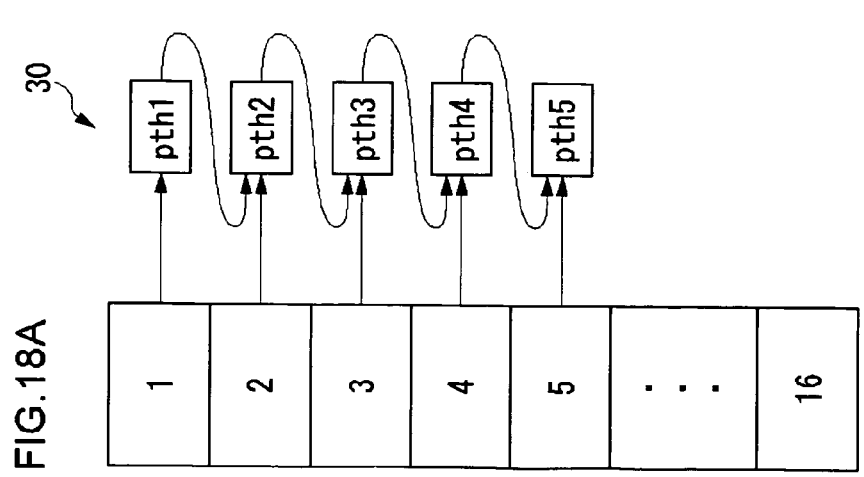

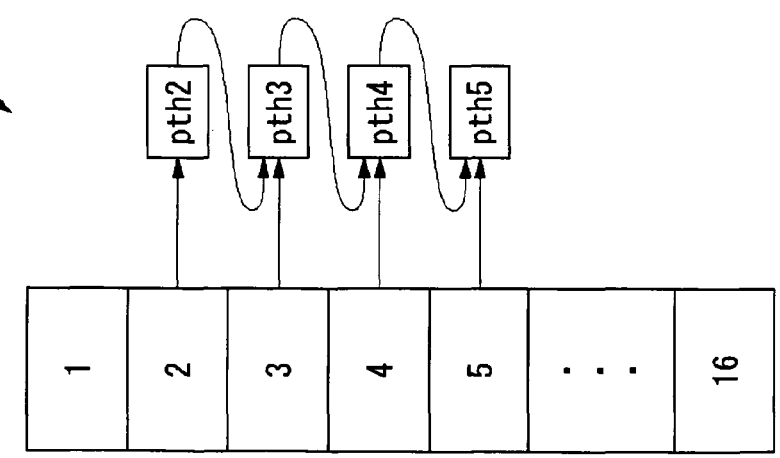

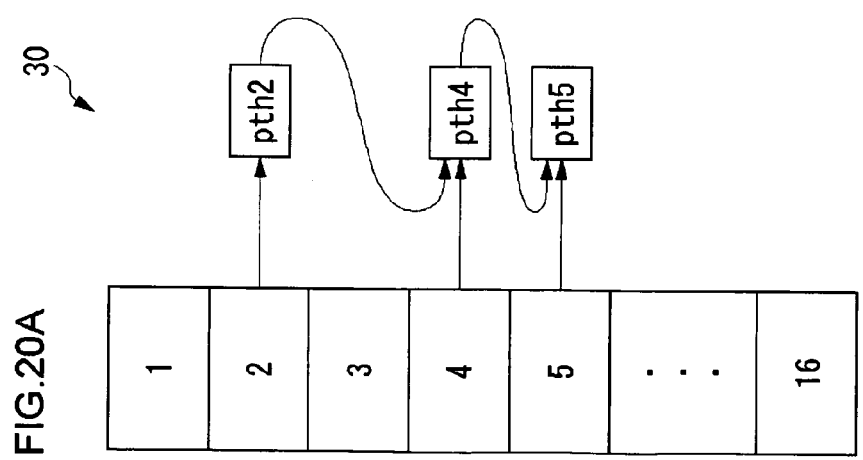

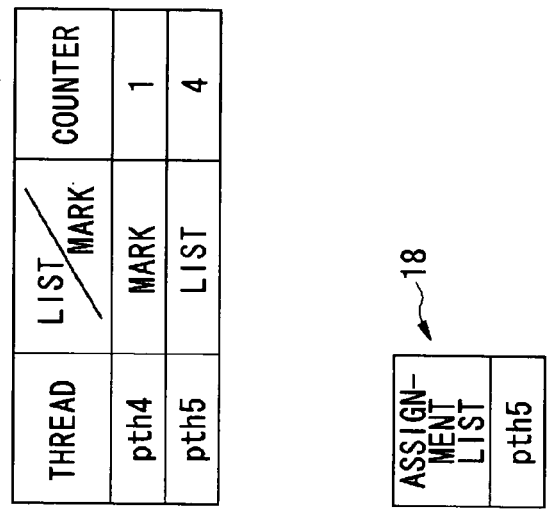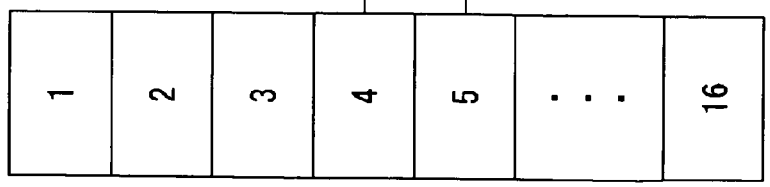

SCHEDULING METHOD, SCHEDULING APPARATUS AND MULTIPROCESSOR SYSTEM

BACKGROUND OF THE INVENTION

1. Field of the Invention

The present invention relates to a scheduling method and scheduling apparatus for scheduling execution units processed in parallel in a multiprocessor system and also relates to a multiprocessor using such a method or apparatus.

2. Description of the Related Art

Operating systems released recently that support multitasks has installed therein a multithread technology that implements a multiprocessing environment in which it is possible to execute a plurality of processes concurrently and that allows each of processes to generate a plurality of threads inside the process for parallel processing. A process is assigned unique resources and an address space for its execution and cannot access areas assigned to other processes. In contrast, a thread is an execution unit generated inside a process. Threads can freely access each other's areas inside the process. A thread is a basic unit to which the operating system assigns execution time of a CPU.

Round-robin scheduling and priority scheduling are known as thread scheduling for assigning CPU time to threads. In round-robin scheduling, threads in a queue are sequentially selected at regular intervals for execution. In priority scheduling, threads are executed in the order of priority. In round-robin scheduling, CPU time is fairly assigned to threads in a queue at regular intervals so that the threads are executed. In priority scheduling, threads of respective priority levels are queued in queues provided for the respective priority levels. Threads are selected from queues in the descending order of priority so that the selected threads are executed.

In a multiprocessor system in which a plurality of processors are mounted, overall processing speed is increased by executing processes in parallel. When a multi-thread environment is implemented in a multiprocessor system, a thread is assigned to one of the processors for execution. Execution speed and memory consumption in a process vary depending on the order of execution of threads. In thread scheduling in a multiprocessor, consideration should be given to efficient ways of using processor resources and delivery and communication of data between threads. Therefore, ideas different from those adapted to thread scheduling in a single-processor system are required.

SUMMARY OF THE INVENTION

The present invention has been made in view of the aforementioned goal and relates to a scheduling technology capable of increasing processing efficiency and improving the use efficiency of the processors by controlling the order of assigning execution units processed in parallel to processors in a multiprocessor system.

One embodiment of the present invention relates to a scheduling method for a multiprocessor system for scheduling the order of assignment of execution units processed in parallel and subject to scheduling to a plurality of processors, comprising: organizing at least one execution unit subject to scheduling into at least group; mapping processor resources, exclusively used by each of the execution units belonging to the same group, to an address space referred to by the execution units so that the execution units can refer to each other's resources; and controlling the assignment of groups to processors under the constraint that all execution units belonging to the same group are assigned to the respective processors at the same time.

Another embodiment of the present invention relates to a scheduling method. The scheduling method for a multiprocessor for scheduling the order of assignment of execution units processed in parallel and subject to scheduling to a plurality of processors, comprises: organizing at least one execution unit subject to scheduling into at least one group so as to manage the assignment to processors in units of groups; determining a priority level of each of the groups in the order of priority set up for the groups and, within the same priority level, in the order of arrival of the groups at a queue; and assigning groups in a wait state or a running state to respective processors in the order of priority, under the constraint that all execution units belonging to the same group are assigned to the respective processors at the same time.

According to this embodiment, all execution units belonging to the same group can be assigned to processors at the same time in the order of priority. Within the same priority level, the order of priority is determined in accordance with the order of arrival at a queue. Therefore, the order of arrival of groups with the same priority level is observed. By determining the order of priority of groups in the running state as well as those in the ready state and assigning the groups to the processors accordingly, assignment of eligible groups to processors can be performed in an integral and simplified manner.

Still another embodiment of the present invention also relates to a scheduling method. The scheduling method for a multiprocessor for scheduling the order of assignment of execution units processed in parallel and subject to scheduling to a plurality of processors, comprises: sequentially retrieving at least one group, each including at least one execution unit subject to scheduling, from a ready queue, the ready queue storing groups in a ready state or a running state in the order of priority set up for the groups and, within the same priority level, in the order of arrival at the queue; and assigning all execution units belonging to the retrieved group to the respective processors only when all execution units belonging to the retrieved group are assignable to the respective groups at the same time, and otherwise assigning a group subsequently retrieved from the ready queue to processors in preference to the group retrieved earlier.

According to this embodiment, when not all execution units belonging to a group are assignable to processors at the same time due to the constraint derived from the total number of processors, the use efficiency of processors in a multiprocessor system can be improved by conceding the right of assignment to a group lower in priority.

If each of the execution units belonging to a group retrieved from the ready queue is already assigned to a processor and is being executed, the assignment of the execution unit being executed to the processor may be preserved so as to prevent the execution unit being executed from being reassigned to another processor, a different assignment destination. With this, the existing assignment of each of the execution units belonging to a group already assigned to processors and being executed is preserved so that the cost incurred in assignment is reduced.

Yet another embodiment of the present invention relates to a scheduling apparatus. The scheduling apparatus for a multiprocessor for scheduling the order of assignment of execution units processed in parallel and subject to scheduling to a plurality of processors, comprises: a memory controller which organizes at least one execution units subject to scheduling into at least one group and which maps processor resources, exclusively used by each of the execution units belonging to the same group, to an address space referred to by the execution units and manages the resources so that the execution units can refer to each other's resources; a ready queue which stores groups in a ready state or a running state; and an assignment unit which sequentially retrieves the groups in the ready queue and which assigns all execution units belonging to the retrieved group to a plurality of processors only when all execution units belonging to the retrieved group are assignable to the respective groups at the same time.

Still another embodiment of the present invention also relates to a scheduling apparatus. The scheduling apparatus for a multiprocessor for scheduling the order of assignment of execution units processed in parallel and subject to scheduling to a plurality of processors, comprises: a ready queue which stores at least one group in a ready state or a running state in the order of priority set up for the groups and, within the same priority level, in the order of arrival at the queue, each group including at least one execution unit subject to scheduling; an assignment list generating unit which sequentially retrieves the groups in the ready queue and which appends a retrieved group to an assignment list storing groups that are candidates for assignment to processors, only when all execution units belonging to the retrieved group are assignable to the respective groups at the same time; and an assignment unit which assigns all execution units belonging to the groups stored in the assignment list generated by the assignment list generating unit to a plurality of processors.

Yet another embodiment of the present invention relates to a multiprocessor system. In the system in which execution units processed in parallel and subject to scheduling are assigned to a plurality of processors for parallel execution, one of the processors includes a scheduler for assigning the execution units subject to scheduling to the rest of the plurality of processors, the scheduler comprising: a memory controller which organizes at least one execution unit subject to scheduling into at least one group and which maps processor resources, exclusively used by each of the execution units belonging to the same group, to an address space referred to by the execution units and manages the resources so that the execution units can refer to each other's resources; a ready queue which stores groups in a ready state or a running state; and an assignment unit which sequentially retrieves the groups in the ready queue and which assigns all execution units belonging to the retrieved group to a plurality of processors only when all execution units belonging to the retrieved group are assignable to the respective groups at the same time.

Still another embodiment of the present invention also relates to a multiprocessor system. In the system in which execution units processed in parallel and subject to scheduling are assigned to a plurality of processors for parallel execution, one of the processors includes a scheduler for assigning the execution units subject to scheduling to the rest of the plurality of processors, the scheduler comprising: a ready queue which stores at least one group in a ready state or a running state in the order of priority set up for the groups and, within the same priority level, in the order of arrival at the queue, each group including at least one execution unit subject to scheduling; an assignment list generating unit which sequentially retrieves the groups in the ready queue and which appends a retrieved group to an assignment list, only when all execution units belonging to the retrieved group are assignable to the respective groups at the same time; and an assignment unit which assigns all execution units belonging to the groups stored in the assignment list generated by the assignment list generating unit to a plurality of processors.

Yet another embodiment of the present invention relates to a scheduling method. The scheduling method for a multiprocessor for scheduling the order of assignment of execution units processed in parallel and subject to scheduling to a plurality of processors, comprises: freeing at least one of the plurality of processors from scheduling for assignment of at least one execution unit; mapping processor resources, exclusively used by an execution unit which is run on a processor free from assignment and which is not subject to scheduling, to an address space referred to by the execution units so that an execution unit subject to scheduling can refer to the resources, and accordingly controlling the assignment of execution units to processors enlisted for assignment.

Still another embodiment of the present invention also relates to a scheduling apparatus. The scheduling apparatus for a multiprocessor for scheduling the order of assignment of execution units processed in parallel and subject to scheduling to a plurality of processors, comprises: a memory controller which frees at least one of the plurality of processors from scheduling for assignment of at least one execution unit, which maps processor resources, exclusively used by an execution unit which is run on a processor free from assignment and which is not subject to scheduling, to an address space referred to by an execution unit subject to scheduling so that the execution unit subject to scheduling can refer to the resources, and which manages the resources accordingly; a ready queue which stores at least one execution unit subject to scheduling in a ready state or a running state; and an assignment unit which sequentially retrieves the execution units subject to scheduling in the ready queue and which assigns the retrieved execution units to the respective processors.

Arbitrary combinations of the aforementioned constituting elements, and implementations of the invention in the form of methods, apparatuses, systems, computer programs and data structures may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 7 shows a thread status table of FIG. 6;

FIG. 9 shows a scheduling array of FIG. 6;

FIG. 14 shows another example of thread status table of FIG. 6;

FIG. 17 shows another example of thread status table of FIG. 6;

FIGS. 18A-18C show a procedure for assigning threads at a given point of time;

FIGS. 19A-19C show a procedure for assigning threads at another point of time;

FIGS. 20A-20C show a procedure for assigning threads at still another point of time;

FIGS. 21A-21C show a procedure for assigning threads at yet another point of time;

DETAILED DESCRIPTION OF THE INVENTION

First Embodiment

Figure 1:
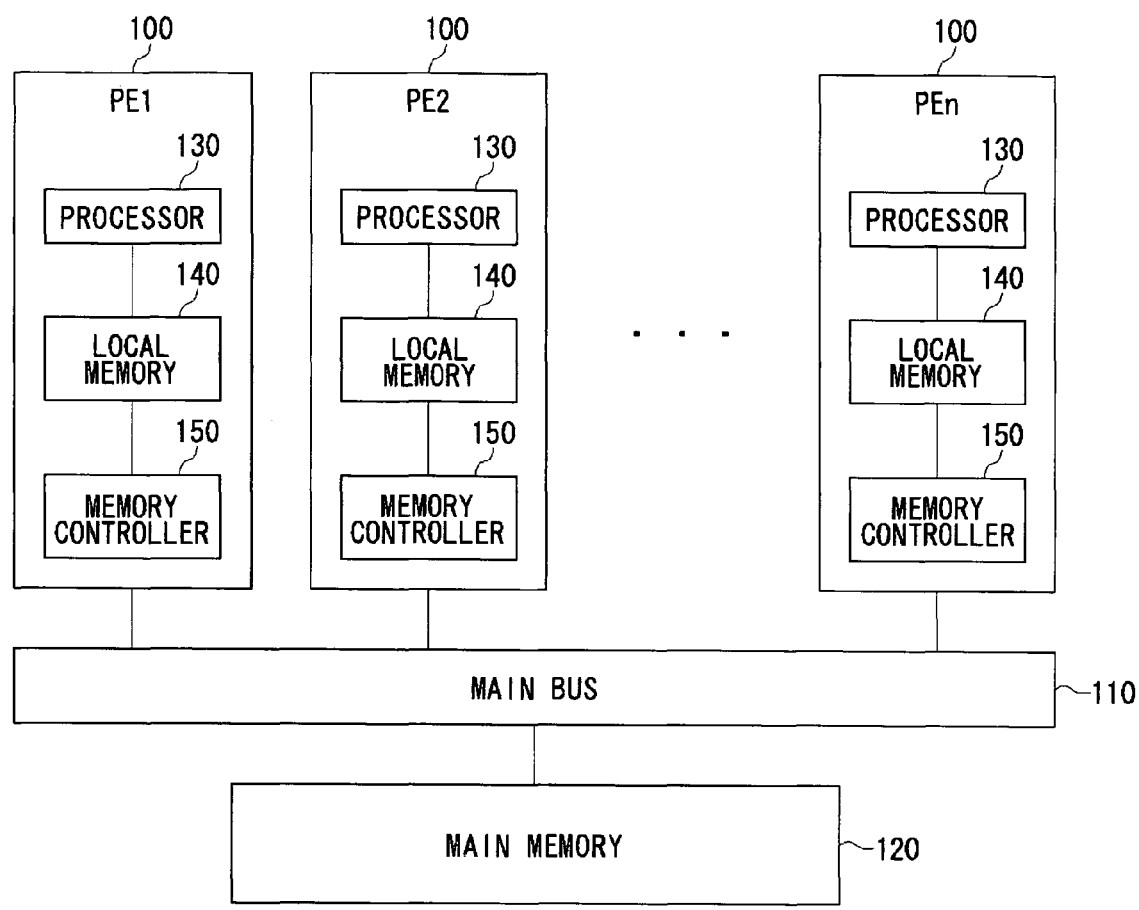
FIG. 1 shows the structure of a multiprocessor according to a first embodiment.

FIG. 1 shows the structure of a multiprocessor system according to a first embodiment. The multiprocessor system includes a plurality of processing elements (PE) 100 and a main memory 120, which are connected to a main bus 110. Each of the processing elements 100 includes a processor 130, a local memory 140 and a memory controller 150. The processor 130 is capable of reading and writing data in the local memory 140. The memory controller 150 provides an interface for referring to data in the local memory 140 from the processor 130 of another processing element 100 and also provides functions for memory synchronization and exclusive control.

One of the processing elements 100 is provided with the function of scheduling execution entities that are execution units in parallel processing and are subject to scheduling (hereinafter, such entities will be referred to as threads). The scheduling function works on the privileged level. On the privileged level, authority is given to access all resources in the multiprocessor system. Programs running on the other processing elements 100 not provided with the scheduling function work on the user level. Unlike the privileged level, only limited resources can be accessed on the user level.

Each of the processors 130 is assigned a thread at a given point of time. A plurality of threads are executed in parallel in the multiprocessor system as a whole. The thread assigned to the processor 130 can exclusively use all resources in the processing element 100 including the local memory 140 and registers inside the memory controller 150.

If a thread is not assigned to any of the processors 130, the context of the thread is saved in the main memory 120 for later restoration. The context of a thread represents the status of all resources that the thread uses exclusively in the processing element 100 that is the destination of assignment (hereinafter, referred to as assignment destination PE). The context includes a set of values held in registers while the thread is alive in the processor 130, data held in the local memory 140 and the internal states of registers in the memory controller 150. When a thread is not alive in the processor 130, the context of that thread is copied to the main memory 120 so that, when the thread is assigned to the processor 130 again, the process can continue by reading the context.

According to the first embodiment, a thread group comprising one or more thread as elements is defined. Scheduling is performed in units of thread groups. All threads belonging to the same thread group are assigned to the respective processors 130 at the same time. A situation does not occur in which some of the threads in a thread group are assigned to processors 130 and the other threads remain in the main memory 120. Accordingly, all threads in the same thread group share transitional states such as ready and running. The threads belonging to the same thread group can directly refer to each other's address spaces without using a system call of the kernel.

Figure 2:
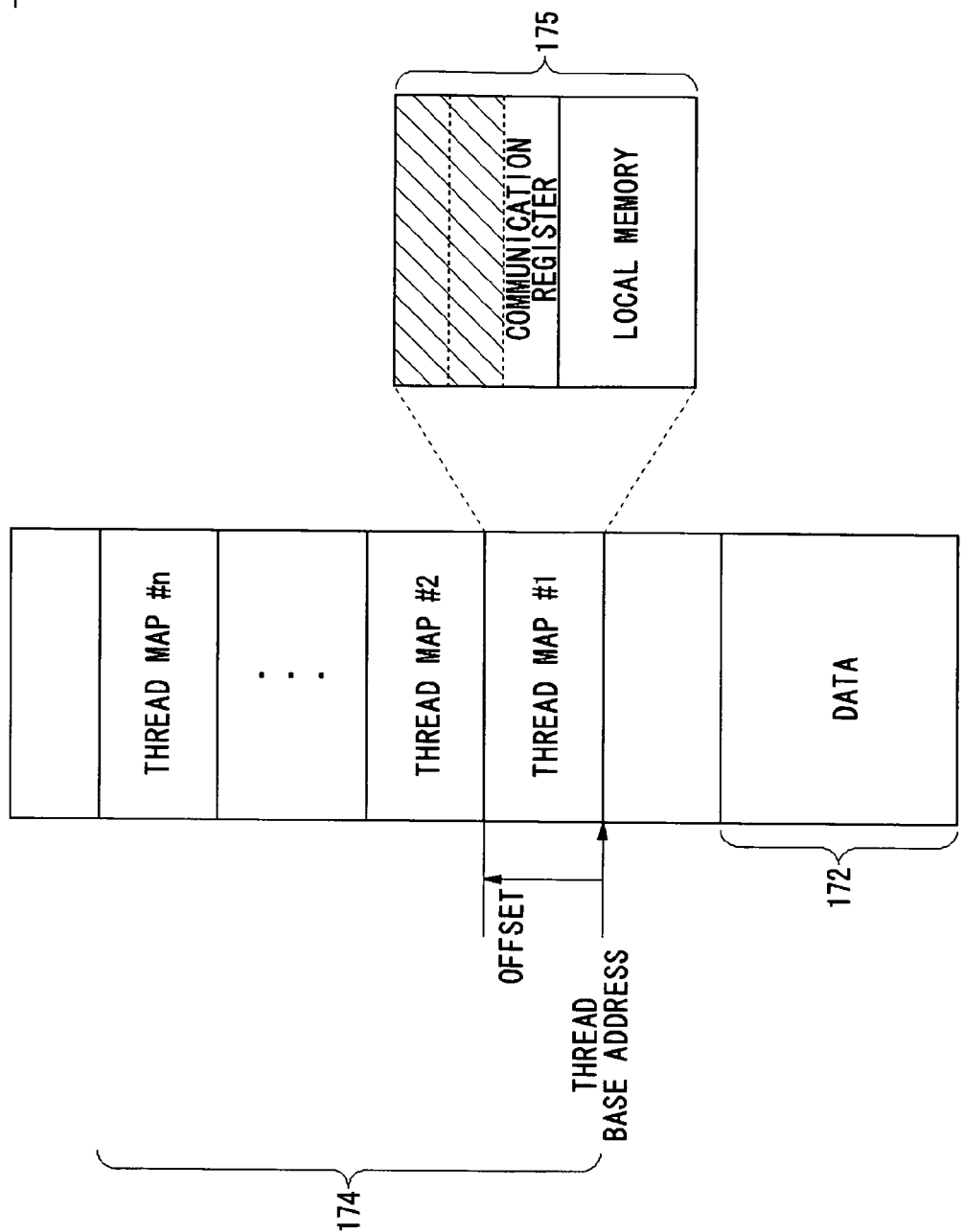
FIG. 2 shows an address space as viewed from a thread assigned to a processor of FIG. 1.

FIG. 2 shows an address space 170 as viewed from a thread assigned to the processor 130. The address space 170 includes a main memory area 172, to which the main memory including common data is mapped, and a thread map area 174 to which the resources exclusively used by the threads in the same group are mapped.

In the thread map area 174, thread maps #1-#n corresponding to the respective threads in the same group are provided. Given that there are n processors, a maximum of n threads can be provided in the same group. Therefore, an area that accommodates n threads maps is secured. Each of the thread maps #1-#n is a memory map of some of the resources exclusively used by the corresponding thread in the assignment destination PE. As indicated by reference numeral 175, the thread map includes a local memory and a register group for externally controlling the memory controller 150. Not all of the registers for externally controlling the memory controller 150 are accessible. Only a communication register described later is accessible. The other registers indicated by a shaded area are not accessible. By mapping not only accessible registers but also mapping the entire register group including access-disabled registers, it is ensured that the size of a thread map is uniform regardless of the type of accessible registers. This causes an offset value from the start address of the thread map to become fixed, facilitating efficient management by a programmer.

By mapping, into the address space, some of the resources exclusively used by the threads in the assignment destinations PE, each of the threads in the same group is capable of accessing and manipulating some of the resources exclusively used by the other threads, without using a system call. By mapping only those registers that permit manipulation into the address space, a certain restriction is imposed on external manipulation of the registers for externally controlling the memory controller 150.

The first thread map #1 is assigned an area that starts with a thread base address and has a thread map size. The start address of the second thread map #2 is determined by incrementing the thread base address by an offset value corresponding to the thread map size.

In configuring the threads in the same group, the thread map to be used by a thread is determined by designating one of the numbers #1-#n of the thread maps. A scheduling apparatus 200 described later holds the identification of thread maps used by the threads in the same group in a memory as configuration information of the thread maps. When the threads are assigned, the configuration information of the thread maps is set up in the memory controller 150 of the assignment destination PE. The memory controller 150 of each processing element 100 is capable of knowing the identity of the thread maps to which the resources of the threads in the same group are mapped when the threads are scheduled, by referring to the configuration information of the thread maps. Requests for accessing resources of other threads can be processed by DMA, by referring to the thread maps in the address space 170.

More specifically, a thread status managing unit 32 of the scheduling apparatus 200 described later manages the configuration information of the thread maps of the thread groups. The thread status managing unit 32 holds the configuration information of the thread maps in, for example, a thread status table 34. A thread assigning unit 14 of the scheduling apparatus 200 assigns threads to processors and sets up the configuration information of the thread groups in the memory controller 150. The threads assigned to the respective processors are started after the configuration information of the thread maps of the thread groups is set up in the memory controller 150.

For example, it will be assumed that two threads A1 and A2 belong to the same group A. It will be assumed that the initial setting of group A is such that the resources of the first thread A1 are mapped to a first area EA1 of the address space for group A and the resources of the second thread A2 are mapped to a second area EA2 of the address space. It will be assumed that the thread A1 is assigned to the first processor and the thread A2 is assigned to the second processor as a result of scheduling the threads A1 and A2 of group A.

When accessing from the first thread A1 alive on the first processor to the second area EA2 holding the thread map of the second thread A2, the resources of the second processor are referred to as the resources of the second thread A2. Assignment to the respective processors and execution of the first thread A1 and the second thread A2 are conducted after the resources are ready. Thus, it is guaranteed that an access from the first thread A1 to the second area EA2 storing the thread map of the second thread A2 is an access to the resources of the second thread A2 regardless of the identity of the processor to which the second thread A2 is assigned. A similar thing is true of an access from the second thread A2 to the first area EA1 storing the address map of the first thread A1.

As described, a thread assigned to one of the processors 130 can directly access the resources exclusively used by the other threads in the same group by DMA, by accessing the address of the thread map set up in the address space 170.

The other threads in the same group are assigned to the respective processors 130. The identity of the processor 130 to which a thread is assigned differs each time the thread is scheduled. The thread map is set up at the same address in the address space 170 regardless of the identity of the processor to which the thread is assigned. Thus, it is guaranteed that each of the threads in the same group can access the resources of other threads by accessing the thread maps in the address space 170, regardless of the assignment of the threads to the respective processors.

The memory controller 150 of each of the processing elements 100 is provided with a communication register available for use in synchronous communication between threads. The values in the communication register can be read from the processor 130 of the processing element 100 by a special instruction. When no values are written yet in the communication register, the processor 130 waits until values are written in the communication register.

The communication register permits the memory controller 150 of the processing element 100 other than the host element to write in the communication register. The communication register in the memory controller 150 is one of the resources exclusively used by a thread and is memory-mapped to the address space 170 as part of the thread map. Therefore, a thread can access and write in the communication register in the memory controller 150 of the processing element 100 not hosting the thread, by referring to the thread map in the address space 170 available to the thread.

By using the communication register memory-mapped to the address space 170, the memory controller 150 can implement an arrangement whereby the process stalls until any other thread writes a value in the communication register of a locally assigned thread, enabling synchronous communication between the threads.

Additionally, the referential function of the memory controller 150 for referring to the address space may be taken advantage of for exclusive control or synchronization using polling in the memory. Memory synchronization and exclusive control can be performed by reading and writing data in the main memory via the memory controller 150, using a memory synchronization instruction provided in the memory controller 150.

Since all threads belonging to the same thread group are concurrently assigned for execution to the respective processors 130, the referential function for referring to the address space and the arrangement for synchronization or exclusive control, which are provided in the memory controller 150 of the processing element 100, may be taken advantage to perform efficient data transfer, synchronous communication and exclusive control/synchronization in the memory, thereby improving processing efficiency.

Figure 3A:
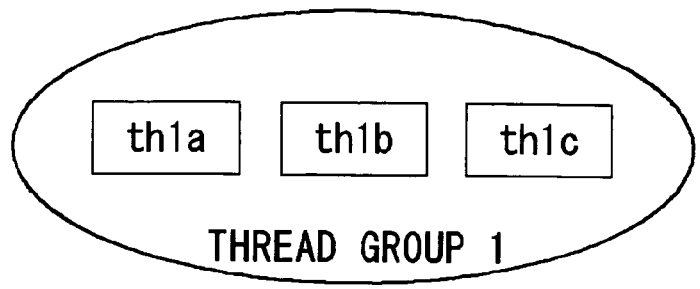
FIGS. 3A-3D show threads run on the processors of FIG. 1 and thread groups to which the threads belong.
Figure 3B:
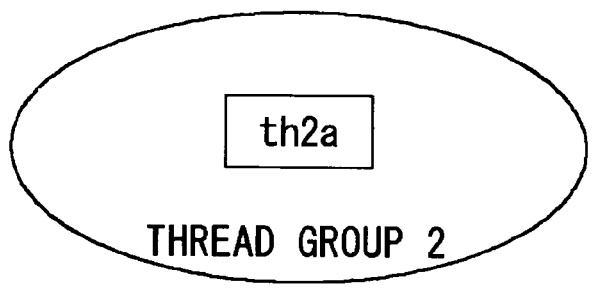
Figure 3C:
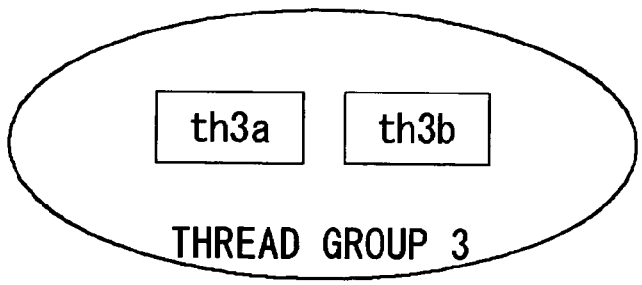
Figure 3D:
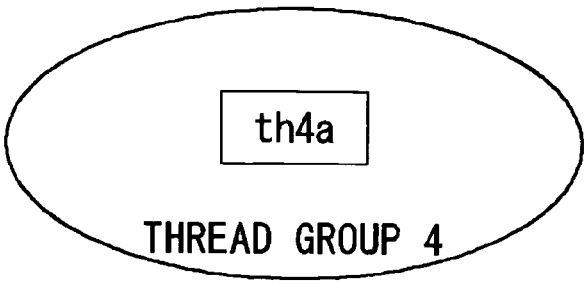

FIGS. 3A-3D show thread groups. FIG. 3A shows a first thread group including three threads th1$a$, th1$b$ and th1$c$. FIG. 3B shows a second thread group including a thread th2$a$. Even if there is only one thread, it is handled as a thread group. Similarly, FIG. 3C shows a third thread group including two threads th3$a$ and th3$b$. FIG. 3D shows a fourth thread group including a thread th4.

One of the threads belonging to a thread group is designated as a primary thread representing the group. In performing scheduling in units of thread groups, all threads belonging to a thread group can be manipulated collectively by manipulating the primary thread.

Figure 4:
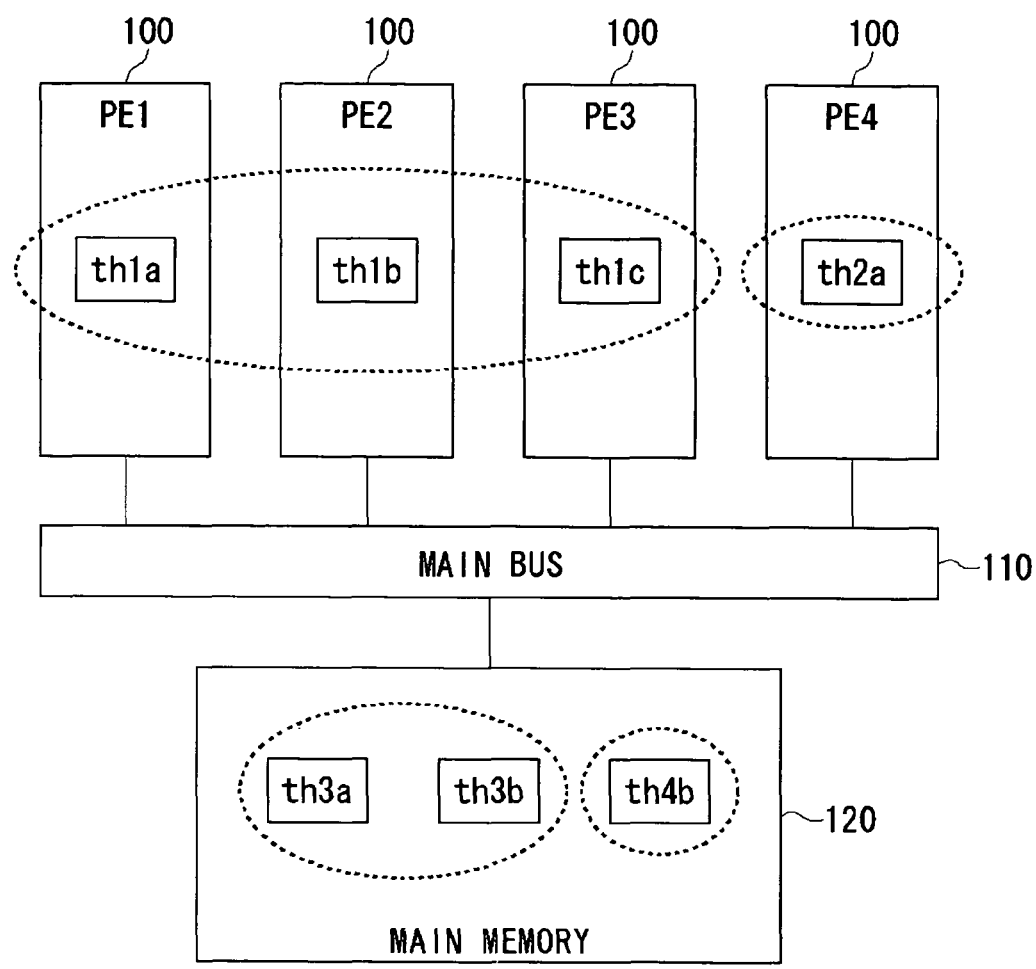
FIG. 4 shows how threads are assigned to processors in units of thread groups shown in FIGS. 3A-3D.

FIG. 4 shows how threads are assigned to the processor 130 in units of thread groups. FIG. 4 shows how the threads belonging to the four thread groups shown in FIG. 3 are assigned to the processors 130 in a multiprocessor system with four processors. At a given point of time, the three threads th1$a$, th1$b$ and th1$c$ belonging to the first thread group are assigned to the first processor, the second processor and the third processor, respectively. The thread th2$a$ belonging to the second thread group is assigned to the fourth processor. The two threads th3$a$ and th3$b$ belonging to the third thread group and the thread th4$a$ belonging to the fourth thread group are saved in the main memory 120.

Thread scheduling is performed on the condition that all threads belonging to the same thread group are assigned to the respective processors 130 at the same time. The first thread group is assigned to the processors 130 only when the three threads th1$a$, th1$b$ and th1$c$ belonging to the first thread group are assignable to the respective processors 130 at the same. It is ensured that a situation is not created in which one or two of the three threads th1a, th1b and th1c are assigned to the respective processors 130 and the remaining one(s) is saved in the main memory 120.

Figure 5:
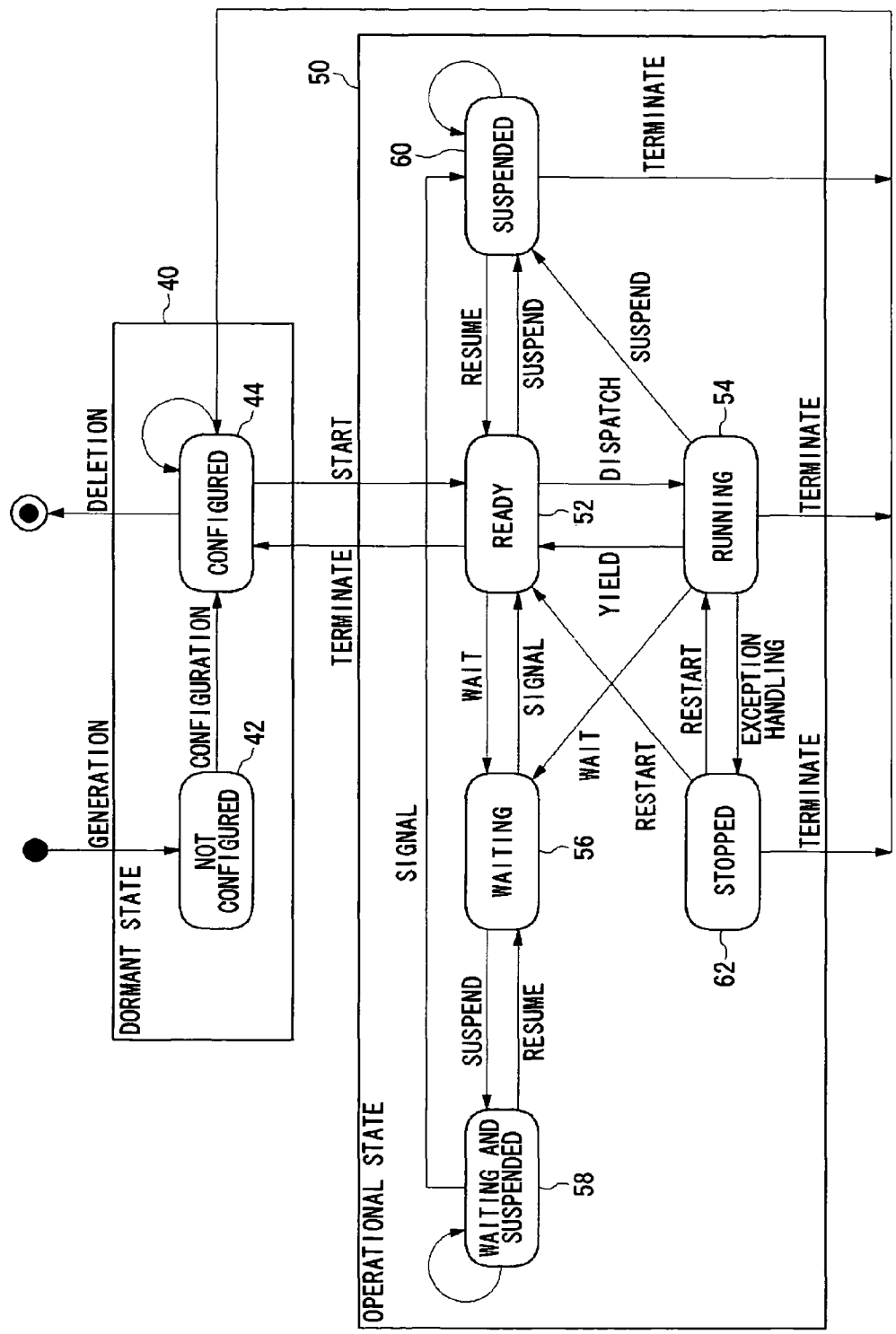
FIG. 5 shows the state transition of threads.

FIG. 5 shows the state transition of threads. A thread is generated by a create command and is placed in a not configured state 42. By executing a configuration command on the thread in the not configured state 42, the thread moves to a configured state 44. By designating a primary thread as an argument of the configuration command, the thread affected by the command is made to belong to the same thread group as the primary thread. By executing a delete command on the thread in the configured state 44, the thread is deleted and a memory area used for the thread is released.

The not configured state 42 and the configured state 44 are collectively referred to as a dormant state 40. By executing a start command on a primary thread in the "configured" state 44, all threads belonging to the thread group, including the primary thread, move to a ready state 52. Subsequently, all threads belonging to the thread group move collectively in an operational state 50. For brevity, a simple term of thread is used to describe state transition in the operational state 50. It should be borne in mind that the term actually refers to all threads belonging to the same thread group. By executing a command targeted at a thread group on a primary thread, all threads belonging to the group are affected.

The thread in the ready state 52 moves to a waiting state 56 by a wait command. The thread in the waiting state 56 returns to the ready state 52 by a signal.

The thread in the ready state 52 moves to a running state 54 by a dispatch command. The thread in the running state 54 returns to the ready state 52 by a yield command, moves to the waiting state 56 by a wait command and moves to a suspended state 60 by a suspend command.

The thread in the waiting state 56 moves to a waiting and suspended state 58 by suspend command. The thread in the waiting and suspended state 58 returns to the waiting state 56 by a resume command. The thread in the waiting and suspended state 58 moves to the suspended state 60 by a signal.

The thread in the suspended state 60 moves to the ready state 52 by a resume command. The thread in the ready state 52 moves to the suspended state 60 by a suspend command.

The thread in the running state 54 moves to a stopped state 62 when an exception handling is performed. The thread in the stopped state 62 moves to the running state 54 or the ready state 52 by a restart command.

When terminated, the thread in the ready state 52, running state 54, stopped state 62 or suspended state 60 is shifted from the operational state 50 to the dormant state 40, moving to the configured state 44.

Of those threads in the operational state 50, threads in the running state 54 are assigned to the respective processors 130 and the other threads are saved in the main memory 120.

Figure 6:
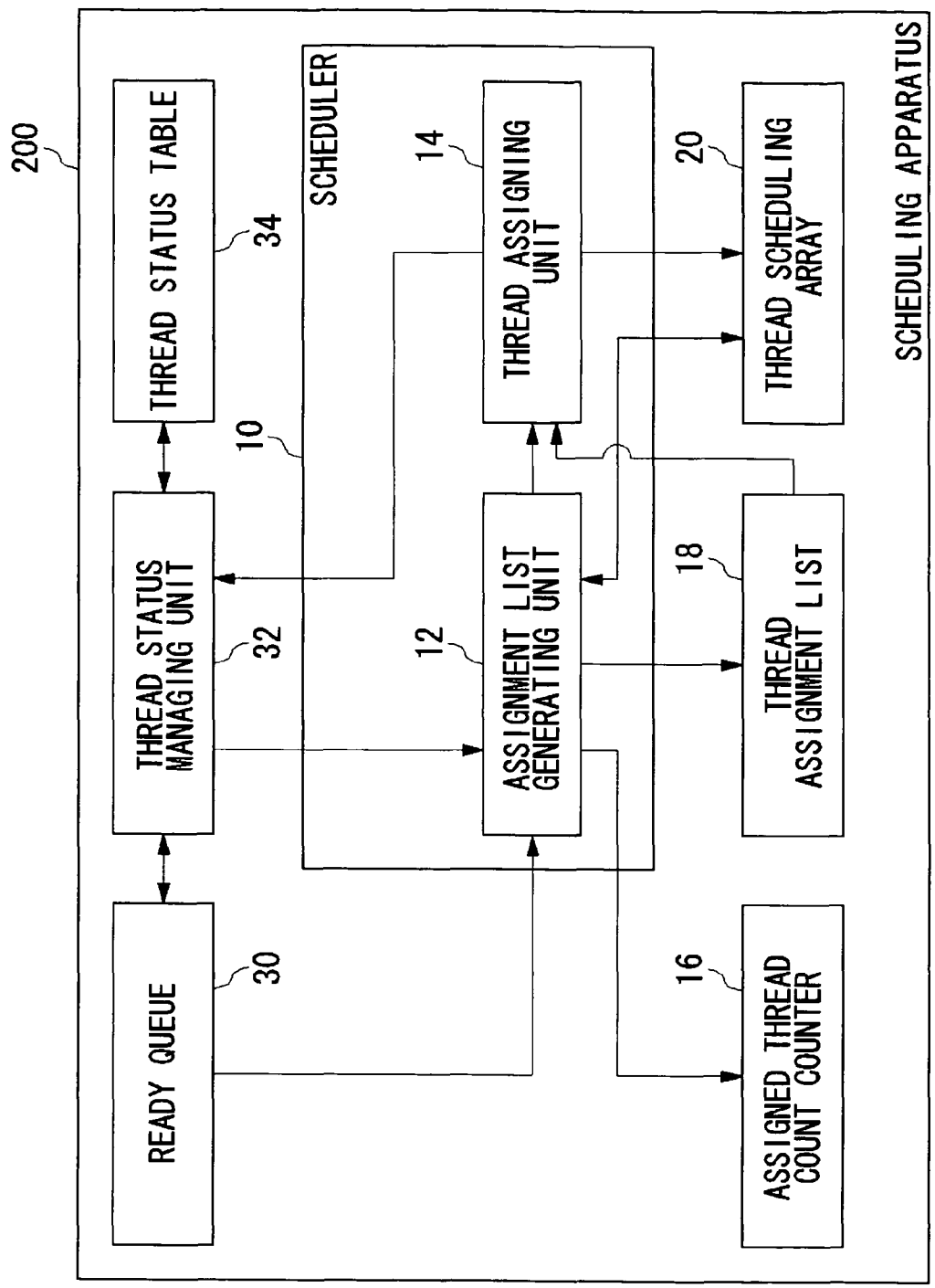
FIG. 6 shows the structure of a scheduling apparatus according to a first embodiment.

FIG. 6 shows the structure of a scheduling apparatus 200 according to the first embodiment. FIG. 6 depicts block diagrams to highlight functions. The functional blocks may be implemented in a variety of manners including hardware only, software only or a combination of both. The scheduling apparatus 200 is provided in one of the processing elements 100 of FIG. 1 and is implemented by using the processor 130, the local memory 140 and the memory controller 150. The main memory 120 may additionally be used for implementation. In the following description, the structure of FIG. 6 will be described by referring to FIGS. 7-9 as appropriate.

A thread status managing unit 32 uses a thread status table 34 to manage the generation and deletion of threads, setup of thread groups, priority of thread groups and state transition in units of thread groups.

FIG. 7 shows the thread status table 34. The thread status table 34 stores a thread group ID 70, the number of threads belonging to a thread group 72, the transitional state of a thread group 74, threads belonging to a thread group 76 and the priority level of a thread group 78, in relation to each other. When an event such as the generation or deletion of a thread, setup or status change of a thread group or setup of priority level occurs, the thread status managing unit 32 updates the thread status table 34.

In the illustrated example, a first thread group with group ID1 and a thread count of 3 includes three threads th1a, th1b and th1c. The priority level of 1 is set up. The current transitional state of the group is running. The second thread group with group ID2 and a thread count of 1 includes a thread th2a. The priority level of 2 is set up. The current transitional state of the group is running. The third thread group with group ID3 and a thread count of 2 includes two threads th3a and th3b. The priority level of 3 is set up. The current transitional state is ready. The fourth thread group with group ID4 and a thread count of 1 includes a thread th4a. The priority level of 4 is set up. The current transitional state is ready. The smaller the value, the higher the priority. While it is assumed here that the priority is grouped into 16 levels, the flexibility in design is allowed. For example, there may be 256 levels of priority.

The thread status managing unit 32 queues those of the thread groups managed by the thread status table 34 that are in the ready state or the running state in a ready queue 30. The ready queue 30 is a queue that stores thread groups in the ready state or the running state in the order of priority set up for the thread groups and, within the same priority level, in the first-in-first-out (FIFO) order such that thread groups are put out of the queue in the same order as they are put into the queue.

Figure 8:
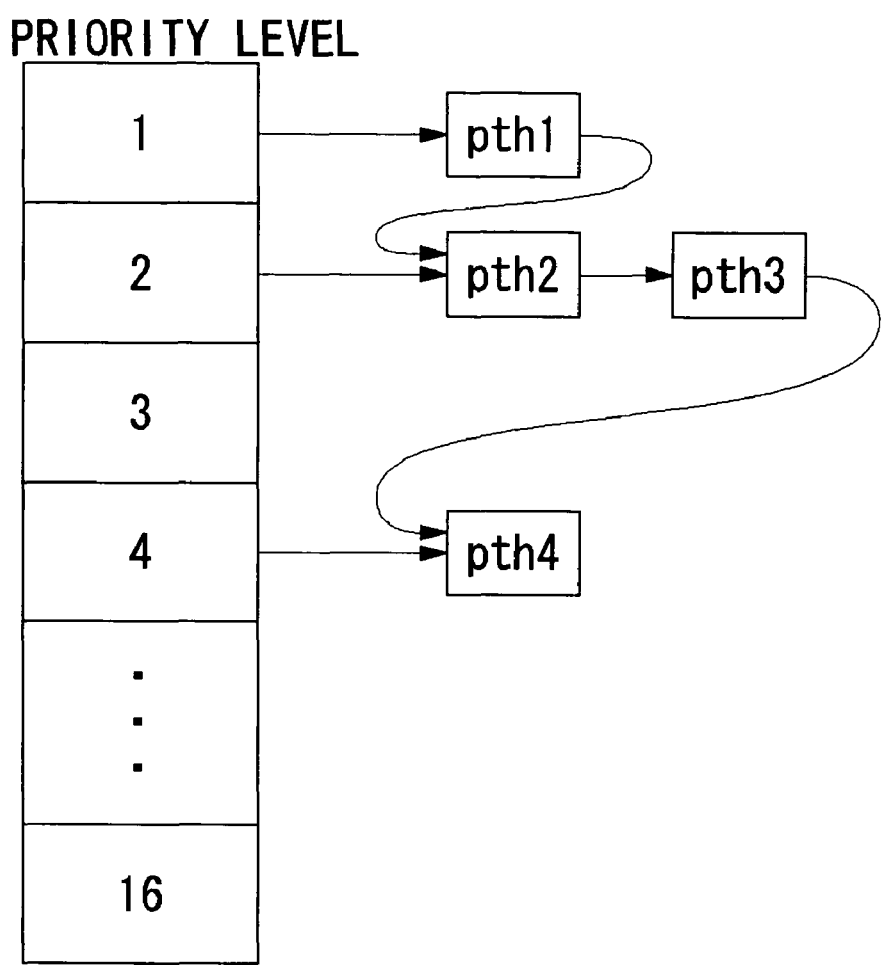
FIG. 8 shows a ready queue of FIG. 6.

FIG. 8 shows the ready queue 30. The primary threads of the respective thread groups each assigned one of 16 priority levels are queued in the FIFO order, creating entries assigned corresponding priority levels.

In the illustrated example, a primary thread pth1 of the first thread group is queued, creating an entry assigned the priority level 1. A primary thread pth2 of the second thread group and a primary thread pth3 of the third thread group are queued in the stated order, creating entries assigned the priority level 2. A primary thread pth4 of the fourth thread group is queued, creating an entry assigned the priority level 4. Since the second thread group is put into the queue before the third thread group, the primary thread pth2 of the second thread group is queued in advance of the primary thread pth3 of the third thread group.

A link is established from the primary thread pth1 assigned the priority level 1 at the head of the ready queue 30 to the primary thread pth2, the head entry assigned the priority level 2. A link is also established from the primary thread pth2, the head entry assigned the priority level 2, to the primary thread pth3 subsequently queued within the same priority level. A link is further established from the primary thread pth3 to the primary thread pth4 assigned the priority level 4. With this, the ready queue 30 is generated in which the entries are prioritized such that the primary threads pth1, pth2, pth3 and pth4 are retrieved in the stated order.

A scheduler 10 retrieves a thread group at the head of the ready queue and assigns the retrieved thread group to one of the processors. The scheduler 10 includes an assignment list generating unit 12 and a thread assigning unit 14. When rescheduling is required as a result of a thread group moving to the waiting state or the suspended state or as a result of a thread being terminated, the thread status managing unit 32 notifies the assignment list generating unit 12 accordingly.

The assignment list generating unit 12 receives a rescheduling instruction from the thread status managing unit 32 so as to perform a "marking process" or an "assignment list generating process" described below.

The assignment list generating unit 12 performs thread scheduling using an assigned thread count counter 16, a thread assignment list 18 and a scheduling array 20.

The assigned thread count counter 16 counts the number of threads assigned to respective processors 130. Hereinafter, the assigned thread count counter 16 will simply be referred to as a counter. The thread assignment list 18 stores primary threads of thread groups to be assigned to respective processors 130. Hereinafter, the thread assignment list 18 will simply be referred to as an assignment list. The scheduling array 20 is a schedule table for holding the status of assignment of threads to respective processors 130 and is an array storing, in relation to each other, processor numbers identifying individual processors 130 and threads assigned to the processors 130.

FIG. 9 shows the scheduling array 20. The scheduling array 20 stores processor numbers 80, threads 82 assigned to the processors and marks 84 in relation to each other. The processor number 80 is an identification number uniquely corresponding to a processor. The mark 84 is used as a flag in a marking process in the assignment list generating unit 12 to preserve the assignment of a thread to a processor. In the illustrated example, the total number of processors is four so that the first through fourth processors are identified by the numbers 1 through 4. The three threads th1a, th1b and th1c of the first thread group are assigned to the processor numbers 1-3, respectively, and the thread th2a of the second thread group is assigned to the processor number 4.

At the start of thread scheduling, the assignment list generating unit 12 initializes the counter 16 to zero and empties the assignment list 18.

The assignment list generating unit 12 sequentially retrieves the primary threads from the ready queue 30. Hereinafter, the thread group to which the retrieved primary thread belongs to will be referred to as an "assignment candidate thread group". The assignment list generating unit 12 increments the counter 16 by the number of threads belonging to the assignment candidate thread group. If the count of the counter 16 exceeds the total number of processors in the multiprocessor system, the assignment list generating unit 12 cancels the candidate status of the assignment candidate thread group and returns the count of the counter 16 to the value occurring before the increment.

The assignment list generating unit 12 examines whether the assignment candidate thread group sequentially retrieved from the ready queue 30 is already in the running state, by referring to the scheduling array 20. If the threads belonging to the assignment candidate thread group are listed in the scheduling array 20, the threads belonging to the assignment candidate thread group are being executed. In this case, the processor numbers to which the running threads are assigned are marked in the scheduling array 20. This will be referred to as a marking process. By performing the marking process, the existing assignment to the processors is preserved to ensure that a thread already assigned to a marked processor number is prevented from being reassigned to another processor, a different assignment destination.

If the threads belonging to the assignment candidate thread group are not listed in the scheduling array 20, i.e., if the assignment candidate thread group is not in the running state, the assignment list generating unit 12 appends the primary thread of the assignment candidate thread group to the assignment list 18. This is referred to as an assignment list generating process. By performing the assignment list generating process, thread groups to be assigned to the respective processors 130 in the current scheduling are listed up in the assignment list 18.

The assignment list generating unit 12 repeats the marking process or the assignment list generating process until the count of the counter 16 reaches the total number of processors or a primary thread is retrieved from the end of the ready queue 30.

When the process by the assignment list generating unit 12 is completed, the thread assigning unit 14 retrieves the primary threads from the assignment list 18 and assigns all threads belonging to the thread groups to respective processor numbers not marked in the scheduling array 20. In this process, a thread assigned to an unmarked processor number and in the running state is preempted and moves to the ready state. The thread assigning unit 14 notifies the thread status managing unit 32 of the preempted thread. The thread status managing unit 32 updates the thread status table 34 and manages the status change of the thread.

In accordance with the scheduling array 20 for holding thread assignment status, threads are actually assigned to respective processors 130 for execution. With this, threads already in the running state continue to be executed on the same processors 130 and threads in the ready state are newly assigned to respective processors 130 and are placed in the running state. The thread status managing unit 32 updates the thread status table 34 and manages the status change of the threads.

Figure 10:
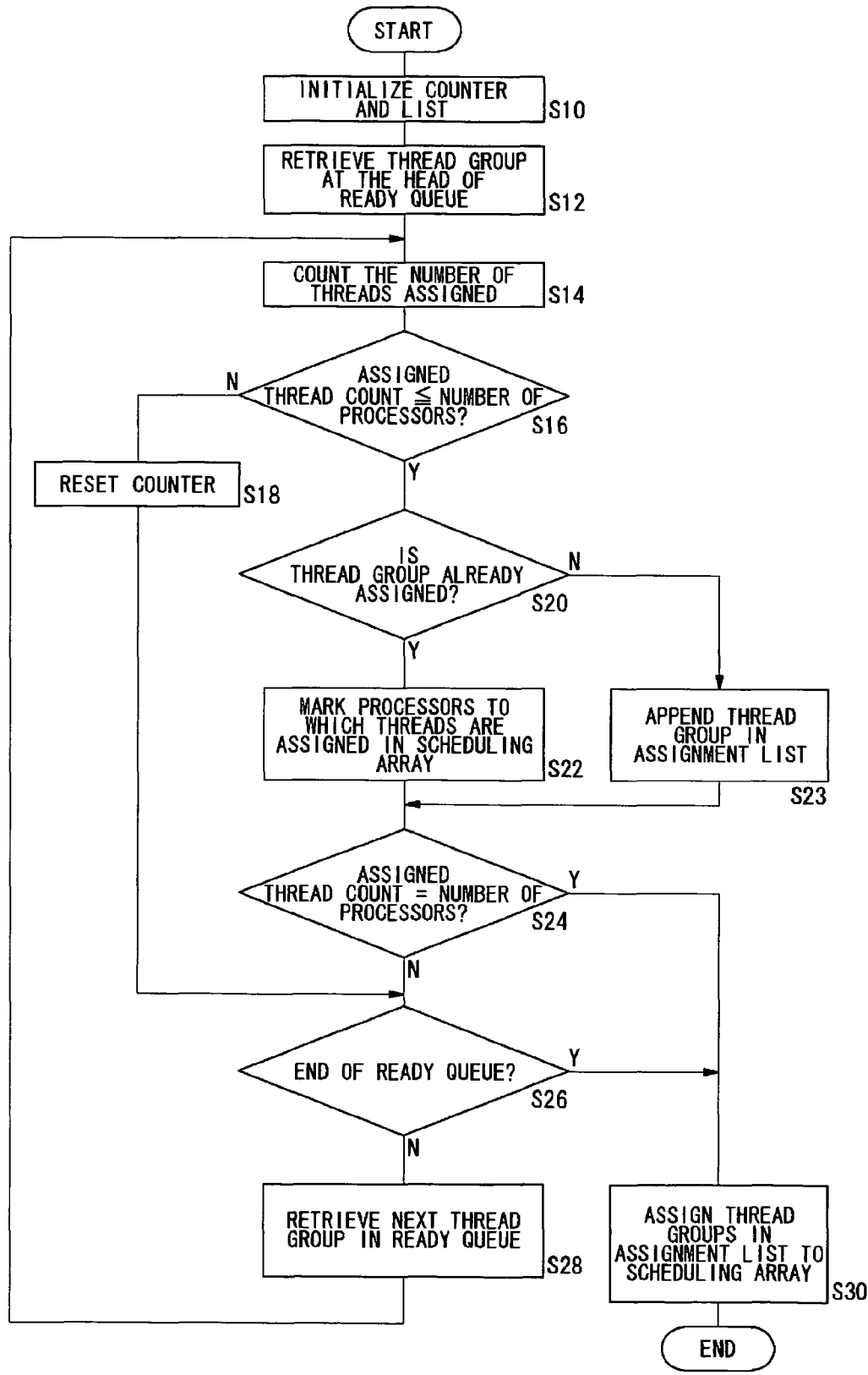
FIG. 10 is a flowchart showing a procedure for scheduling by the scheduling apparatus according to the first embodiment.
Figure 11:
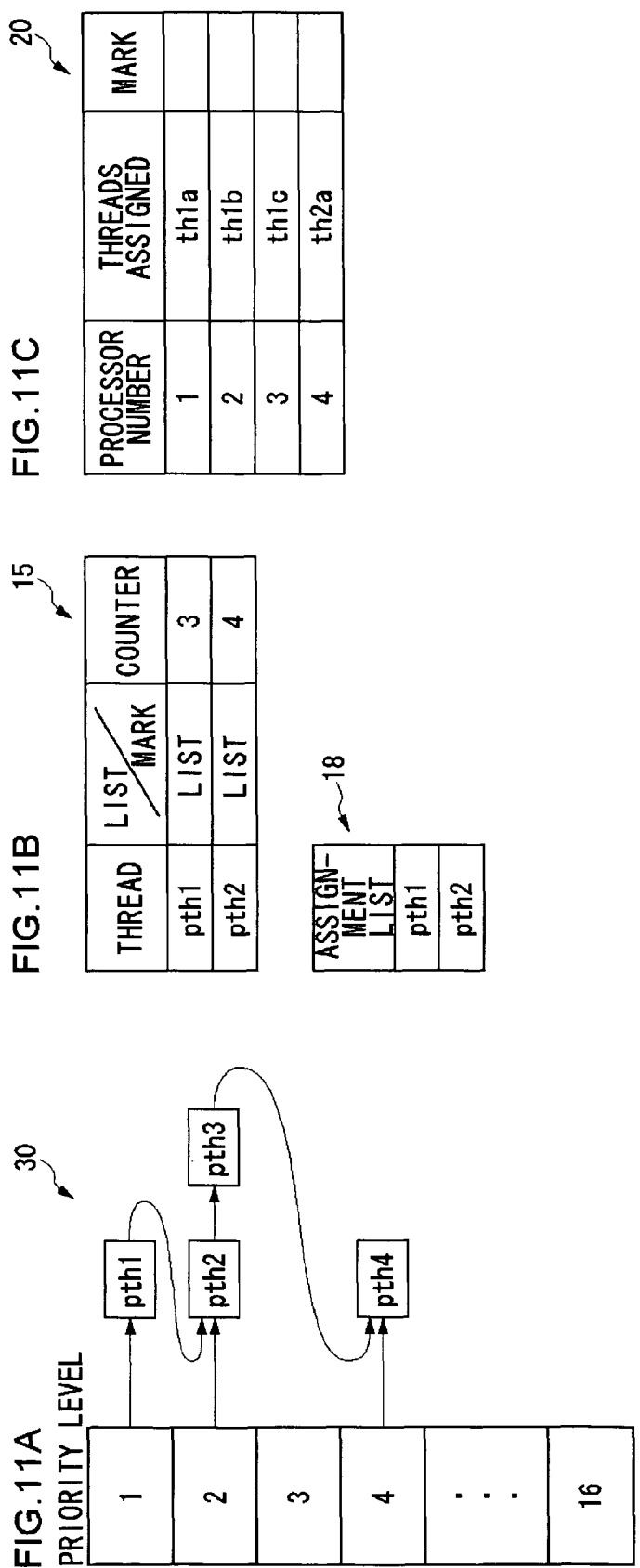
FIGS. 11A-11C show a procedure for assigning threads at a given point of time.
Figure 12:
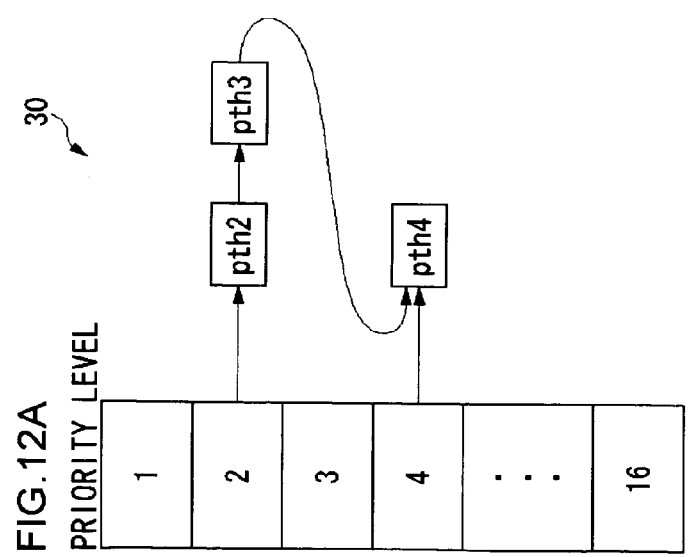
FIGS. 12A-12C show a procedure for assigning threads at another point of time.

FIG. 10 is a flowchart showing a procedure for thread scheduling by the scheduling apparatus 200 with the above-described structure.

The thread status managing unit 32 directs the assignment list generating unit 12 to schedule threads when the transitional state of a thread changes from the running state to the waiting state or suspended state or when a thread is completed. The assignment list generating unit 12 initializes the counter 16 and the assignment list 18 (S10).

The assignment list generating unit 12 retrieves the assignment candidate thread group at the head of the ready queue 30 (S12). The assignment list generating unit 12 counts the number of threads assigned, by incrementing the count of the counter 16 by the number of threads belonging to the assignment candidate thread group (S14).

The assignment list generating unit 12 determines whether the count of the counter 16 is equal to smaller than the total number of processors (S16). If the count of the counter 16 exceeds the total number of processors, it means that not all threads belonging to the assignment candidate thread group can be assigned to the processors at the same time. Therefore, the assignment list generating unit 12 returns the count to its original value by subtracting therefrom the number threads belonging to the assignment candidate thread group (S18). The assignment list generating unit 12 then proceeds to step S26.

If the count of the counter 16 is equal to or smaller than the total number of processors (Y in S16), the assignment list generating unit 12 examines whether the threads belonging to the assignment candidate thread group are stored in the scheduling array 20 (S20). If the threads belonging to the assignment candidate thread group are assigned to the respective processor numbers in the scheduling array 20, it is determined that the threads are assigned to the respective processors for execution in the previous scheduling.

If the threads belonging to the assignment candidate thread group are listed in the scheduling array 20 (Y in S20), the assignment list generating unit 12 marks the processor numbers to which the threads are assigned in the scheduling array 20 (S22). The existing assignment to the processors is preserved to ensure that each of the threads already assigned to the marked processor numbers is prevented from being reassigned to another processor, a different assignment destination.

If the threads belonging to the assignment candidate thread group are not listed in the scheduling array 20 (N in S20), the assignment list generating unit 12 appends the assignment candidate thread group to the assignment list 18 (S23).

If the count of the counter 16 is equal to the total number of processors (Y in S24), the assignment list generating unit 12 terminates the generation of the assignment list 18 because the assignment of threads is no longer possible. The assignment list generating unit 12 then proceeds to step S30. If the assignment candidate thread group is the one retrieved from the end of the ready queue 30 (Y in S26), the assignment list generating unit 12 also terminates the generation of the assignment list 18 because no threads remain for further assignment. The assignment list generating unit 12 then proceeds to step S30.

If the count of the counter 16 has not reached the number of processors (N in S24) and the assignment candidate thread group is not the one retrieved from the end of the ready queue 30 (N in S26), the assignment list generating unit 12 retrieves the next thread group in the ready queue 30 (S28) and repeats the process in step S14 and subsequent steps.

In step S30, the thread assigning unit 14 assigns the threads belonging to the thread groups stored in the assignment list 18 to the respective processor numbers not marked in the scheduling array 20. In this process, threads in the running state and assigned to unmarked processor numbers are preempted and are removed from the assigned state. When the assignment of all thread groups stored in the assignment list 18 to the respective processor numbers is complete, a sequence of thread scheduling is terminated.

Some examples of thread scheduling procedure will now be given. FIGS. 11A-13 show a thread scheduling procedure performed when the thread status table 34 is as shown in FIG. 7.

It will be assumed that the total number of processors in the multiprocessor system is four. It will also be assumed that all four thread groups are in the ready state and the system is in an initial state in which none of the threads is assigned to a processor. The current time is t1.

FIG. 11A shows the initial state of the ready queue 30. The primary thread pth1 of the first thread group (hereinafter, referred to as a first primary thread) is queued, creating an entry assigned the priority level 1. The primary thread pth2 of the second thread group (hereinafter, referred to as a second primary thread) and the primary thread pth3 of the third thread group (hereinafter, referred to as a third primary thread) are queued, creating entries assigned the priority level 2. The primary thread pth4 of the fourth thread group (hereinafter, referred to as a fourth primary thread) is queued, creating an entry assigned the priority level 4.

The second primary thread pth2 is queued in advance of the third primary thread pth3. Accordingly, the ready queue 30 is a queue in which the first primary thread pth1, the second primary thread pth2, the third primary thread pth3 and the fourth primary thread pth4 are assigned the priority levels in the stated order.

FIG. 11B shows the result of the marking process and the assignment list generating process performed by the assignment list generating unit 12. A process progress table 15 shows which of the marking process and the assignment list generating process is performed on primary threads sequentially retrieved by the assignment list generating unit 12 from the ready queue 30. The table 15 also shows the count of the counter 16 occurring after the retrieval.

The assignment list generating unit 12 retrieves the first primary thread pth1 at the head of the ready queue 30 of FIG. 11A and increments the count of the counter 16 by three, the number of threads in the first thread group. The scheduling array 20 is empty and so none of the threads is subject to the marking process. Therefore, the first primary thread pth1 is directly stored in the assignment list 18.

Further, the assignment list generating unit 12 retrieves the second primary thread pth2, the next entry in the ready queue 30 of FIG. 11A and increments the count of the counter 16 by one, the number of threads in the second thread group. The second primary thread pth2 is also not subject to the marking process and so is appended to the assignment list 18. The count occurring at this point of time is 4, meaning that the count has reached the total number of processors. Therefore, the assignment list generating unit 12 terminates the generation of the assignment list 18.

The thread assigning unit 14 assigns all threads belonging to the first and second thread groups listed in the assignment list of FIG. 11B to the respective processor numbers not marked in the scheduling array 20.

FIG. 11C shows the scheduling array 20 in which the threads are assigned to respective processors in accordance with the assignment list 18. None of the processor numbers is marked. The three threads th1*a*, th1*b* and th1*c* of the first thread group are assigned to the first through third processors, respectively. The thread th2*a* of the second thread group is assigned to the fourth processor. This completes thread scheduling at time t0.

It will be assumed that, at subsequent time t1, the threads in the first thread group are placed in a state such as the waiting state, the suspended state or the terminated state, none of which is the running state or the ready state, FIG. 12A shows the ready queue 30 at time t1. The first primary thread pth1 is neither in the ready state nor in the running state so that the thread status managing unit 32 removes the first primary thread pth1 from the ready queue 30. As a consequence of this, at time t1, the second primary thread pth2 is at the head of the ready queue 30.

The assignment list generating unit 12 is notified by the thread status managing unit 32 accordingly so as to initialize the counter 16 and the assignment list 18 and start scheduling. FIG. 12B shows the result of the marking process and the assignment list generating process performed by the assignment list generating unit 12 at time t1.

The assignment list generating unit 12 retrieves the second primary thread pth2 at the head of the ready queue 30 and increments the count of the counter 16 by one, the number of threads in the second thread group, with the result that the counter value is 1.

The assignment list generating unit 12 examines whether the primary thread th2*a* of the second thread group is listed in the scheduling array 20. At this point of time, the scheduling array 20 is in the state shown in FIG. 11C occurring at time t0. The thread th2*a* of the second thread group is assigned to the processor number 4. Therefore, the assignment list generating unit 12 marks the processor number 4 in the scheduling array 20, as shown in FIG. 12C.

The assignment list generating unit 12 then retrieves the third primary thread pth3, the next entry in the ready queue 30 and increments the count of the counter 16 by two, the number of threads in the third thread group, with the result that the counter value is 3.

The assignment list generating unit 12 examines whether the threads th3a and th3b of the third thread group are listed in the scheduling array 20. Since the threads th3a and th3b of the third thread group are not listed in the scheduling array 20 shown in FIG. 11C occurring at time t0, the assignment list generating unit 12 appends the third primary thread pth3 to the assignment list 18.

The assignment list generating unit 12 retrieves the fourth primary thread pth4, the next entry in the ready queue 30 and increments the count of the counter 16 by one, the number of threads in the fourth thread group, with the result that the counter value is 4.

Since the fourth thread th4a of the fourth thread group is not listed in the scheduling array 20, the assignment list generating unit 12 similarly appends the fourth primary thread pth4 to the assignment list 18. Since the count of the counter 16 has reached 4, the total number of processors, the assignment list generating unit 12 terminates the generation of the assignment list 18.

The thread assigning unit 14 assigns all threads belonging to the third and fourth thread groups listed in the assignment list 18 of FIG. 12B to the respective processor numbers not marked in the scheduling array 20.

FIG. 12C shows the scheduling array 20 in which the threads are assigned to the respective processors in accordance with the assignment list 18. Since the processor number 4 is marked, the assignment of the thread th2a of the second thread group to that processor number is maintained. The two threads th3a and th3b of the third thread group and the thread th4a of the fourth thread group are assigned to the unmarked processor numbers 1-3. This completes thread scheduling at time t1.

Figure 13:
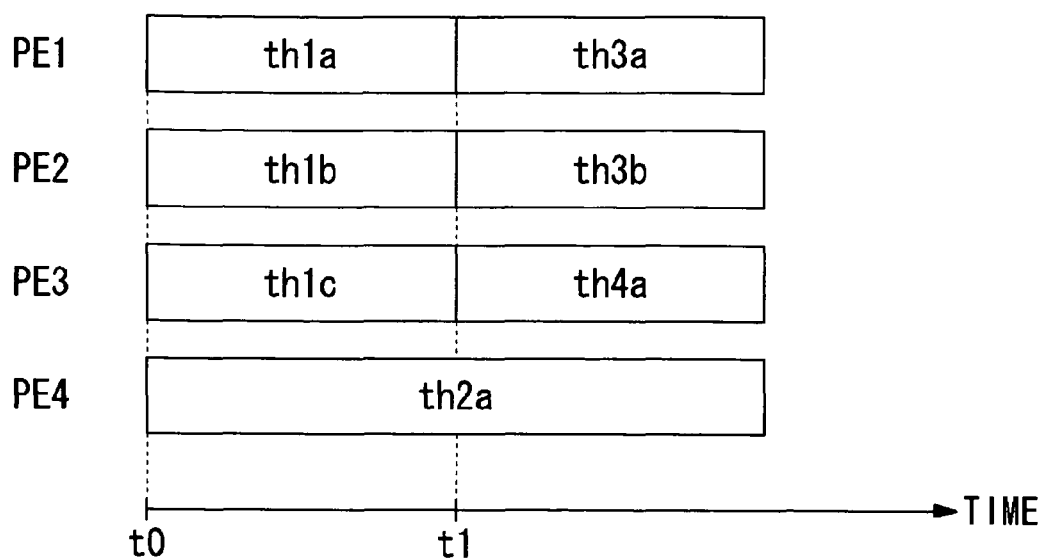
FIG. 13 shows time-dependent variation of thread assignment status according to the thread scheduling of FIGS. 11A-11C and FIGS. 12A-12C.
Figure 15:
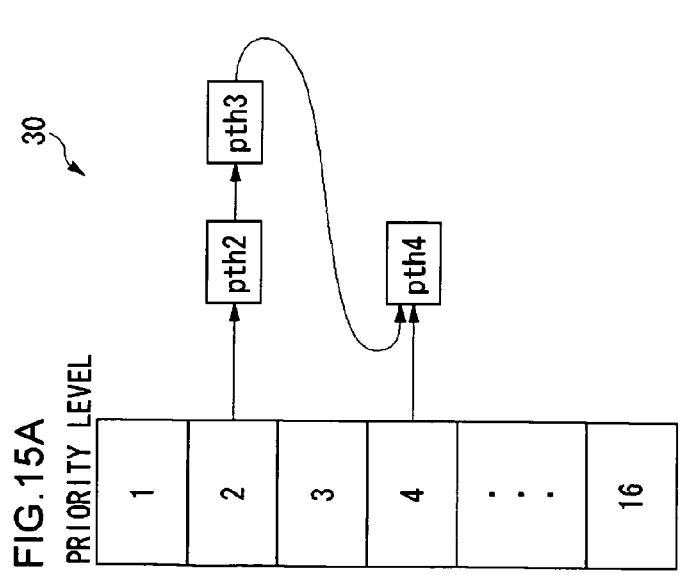
FIGS. 15A-15C show a procedure for assigning threads at a given point of time.

FIG. 13 shows time-dependent variation of thread assignment status according to the thread scheduling described with reference to FIGS. 11A-11C and FIGS. 12A-12C. At time t0, the three threads th1a-th1c of the first thread group are assigned to the first through third processors (PE1-PE3) for execution. The thread th2a of the second thread group is assigned to the fourth processor (PE4) for execution.

At time t1, rescheduling is initiated since the three threads th1a-th1c of the first thread group are removed from the ready queue 30 as a result of, for example, moving to the waiting state. The thread th2a of the second thread group with the highest priority at that point of time remains assigned to the fourth processor for continued execution. To the first through third processors that become available for assignment, the two threads th3a and th3b of the third thread group and the thread th4a of the fourth thread group are respectively assigned.

FIGS. 14A-16 show an example of another thread scheduling. In this example, "inversion in the priority order" will be explained.

FIG. 14 shows the thread status table 34 in this example. The difference from the example of FIG. 7 is that there are four threads in the third thread group, the other details being the same as those of FIG. 7. As such, the result of scheduling at time t0 is the same as that of FIG. 11 so that the description thereof is omitted. The following description concerns a procedure for scheduling at time t1, when the threads of the first thread group are removed from the ready queue 30 as a result of, for example, being placed in the waiting state.

FIG. 15A shows the status of the ready queue 30 at time t1. Similarly to the situation shown in FIG. 12A, the second primary thread pth2 is located at the head of the ready queue 30 as a result of the first primary thread pth1 being removed from the ready queue 30.

FIG. 15B shows the result of the marking process and the assignment list generating process performed by the assignment list generating unit 12 at time t1.

The assignment list generating unit 12 retrieves the second primary thread pth2 at the head of the ready queue 30 and increments the count of the counter 16 by one, the number of threads in the second thread group, with the result that the counter value is 1.

Since the thread th2a of the second thread group is listed in the scheduling array 20, the assignment list generating unit 12 marks the processor number 4 in the scheduling array 20, as shown in FIG. 15C.

The assignment list generating unit 12 then retrieves the third primary thread pth3, the next entry in the ready queue 30. Since the counter value of 5 results by incrementing the count of the counter 16 by four, the number of threads in the third thread group, the assignment list generating unit 12 determines that the assignment of the third thread group is impossible. The assignment list generating unit 12 cancels the candidate state of the third thread group and does not perform either the marking process or the assignment list generating process in the third thread group.

The assignment list generating unit 12 retrieves the fourth primary thread pth4, the next entry in the ready queue 30. The assignment list generating unit 12 increments the count of the counter 16 by one, the number of threads in the fourth thread group, with the result that the count value is 2. Since the thread th4a is not listed in the scheduling array 20, the assignment list generating unit 12 appends the fourth primary thread pth4 to the assignment list 18. Since the thread th4a of the fourth thread group is the last entry in the ready queue 30, the assignment list generating unit 12 terminates the generation of the assignment list 18.

The thread assigning unit 14 assigns all threads belonging to the fourth thread group listed in the assignment list 18 of FIG. 15B to the respective processor numbers not marked in the scheduling array 20.

FIG. 15C shows the scheduling array 20 in which the threads are assigned to the respective processors in accordance with the assignment list 18. The assignment of the thread th2a of the second thread group to the marked processor number 4 is maintained. The thread th4a of the fourth thread group is assigned to the unmarked processor number 1. This completes thread scheduling at time t1.

Figure 16:
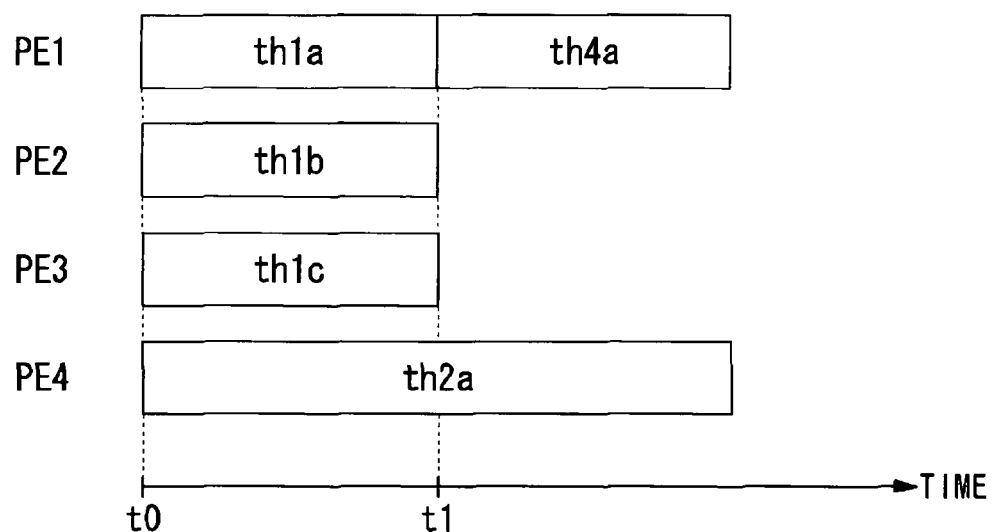
FIG. 16 show time-dependent variation of thread assignment status according to the thread scheduling of FIGS. 15A-15C.

FIG. 16 shows time-dependent variation of thread assignment status in this example. The assignment of threads at time t0 is the same as that of FIG. 13. At time t1, the thread th2a of the second thread group with the highest priority is maintained in the running state as in FIG. 13. Since the third thread group with the next highest priority includes four threads, the threads cannot be assigned to available processors. Instead, the thread th4a of the fourth thread group lower in priority than the third thread group is assigned to the first processor for execution.

As described, all threads belonging to the same thread group are assigned to the respective processors at the same time. Under this constraint, inversion in the order of priority is allowed to occur in order to improve the use efficiency of processor resources, even under a scheduling policy in which the priority order is observed to the possible extent.

The condition for inversion in the order of priority to occur in thread scheduling is as follows. Given that H, M and L indicate thread groups, $P(X)$ indicates the priority of thread group X, and $N(X)$ indicates the number of threads belonging to thread group X, inversion in the order of priority occurs when $P(H) \geq P(M) > P(L)$ and when the following relations hold for the numbers of threads.

$N(H)+N(M)>n$ $N(H)+N(L)\leq n$

When the above relations hold, not all threads belonging to thread group M are assignable to processors but all threads belonging to thread group N lower in priority are assignable to the respective processors. In such a situation, the thread scheduling scheme according to the first embodiment inverts the order of priority in order to improve the use efficiency of processors such that the thread group N lower in priority is assigned.

FIGS. 17 through 22 show another example of thread scheduling. In this example, a description will be given of a situation in which threads already assigned are preempted by other threads of higher priority and are removed from the assigned state.

FIG. 17 shows the thread status table 34. There are first through fifth thread groups, the number of threads in the groups being two, three, one, one and three, respectively, and the assigned priority levels being 1, 2, 3, 4 and 5, respectively.

FIGS. 18A-18C show thread scheduling performed at time t0. As shown in FIG. 18A, the first through fifth primary threads pth1-pth5 are queued in the ready queue 30 in the stated order.

FIG. 18B shows the result of the marking process and the assignment list generating process performed by the assignment list generating unit 12. The assignment list generating unit 12 retrieves the first primary thread pth1 at the head of the ready queue 30 and increments the count of the counter 16 by two, the number of threads in the first thread group. The assignment list generating unit 12 also appends the first primary thread pth1 to the assignment list 18.

The assignment list generating unit 12 retrieves the second primary thread pth2, the next entry in the ready queue 30. Since the number of threads in the second thread group is three and count of the counter 16 incremented by the number of threads in the second thread group exceeds 4, the total number of processors, the second thread group cannot be assigned.

Accordingly, the assignment list generating unit 12 retrieves the third primary thread pth3, the next entry in the ready queue 30, and increments the count of the counter 16 by one, the number of threads in the third thread group, with the result that the counter value is 3. The assignment list generating unit 12 appends the third primary thread pth3 to the assignment list 18. With this, inversion in the order of priority occurs in which the third thread group lower in priority than the second thread group is assigned to a processor in preference to the second thread group.

Further, the assignment list generating unit 12 retrieves the fourth primary thread pth4, the next entry in the ready queue 30 and increments the count of the counter 16 by one, the number of threads in the fourth thread group, with the result that the counter value is 4. The assignment list generating unit 12 appends the fourth primary thread pth4 to the assignment list 18. Since the count of the counter 16 reaches 4, the total number of processors, the assignment list generating unit 12 terminates the generation of the assignment list 18.

The thread assigning unit 14 assigns the threads belonging to the first, third and fourth thread groups listed in the assignment list 18 of FIG. 18B to the respective processor numbers in the scheduling array 20. As shown in FIG. 18C, the two threads th1a and th1b of the first thread group are assigned to the processor numbers 1 and 2, respectively. The thread th3a of the third thread group is assigned to the processor number 3. The thread th4a of the fourth thread group is assigned to the processor number 4.

It will be assumed that the threads of the first thread group are placed in the waiting state at time t1. As a result, the second primary thread pth2 is located at the head of the ready queue 30, as shown in FIG. 19A.

As shown in FIG. 19B, the assignment list generating unit 12 retrieves the second primary thread pth2 at the head of the ready queue 30 and increments the count of the counter 16 by three, the number of threads in the second thread group, with the result that the counter value is 3. Since the threads of the second thread group are not listed in the scheduling array 20 occurring earlier at time t0, the assignment list generating unit 12 appends the second primary thread pth2 to the assignment list 18.

The assignment list generating unit 12 then retrieves the third primary thread pth3, the next entry in the ready queue 30 and increments the count of the counter 16 by one, the number of threads in the third thread group, with the result that the counter value is 4. Since the thread th3a of the third thread group is listed in the scheduling array 20 occurring earlier at time t0, the assignment list generating unit 12 marks the processor number 3 to which the thread th3a of the third thread group is assigned in the scheduling array 20, as shown in FIG. 19C.

Since the count of the counter 16 reaches 4, the total number of processors, the thread assigning unit 14 assigns the three threads th2a, th2b and th2c belonging to the second thread group listed in the assignment list 18 to the processor numbers 1, 2 and 4, respectively, not marked in the scheduling array 20, as shown in FIG. 19C. The thread th4a of the fourth thread group assigned to the processor number 4 is preempted by the thread th2c of the second thread group and is removed from the state of being assigned to a processor.

It will be assumed that the thread th3a of the third thread group is terminated at time t2. With this, the third primary thread pth3 is removed from the ready queue 30, as shown in FIG. 20A.

As shown in FIG. 20B, the assignment list generating unit 12 retrieves the second primary thread pth2 at the head of the ready queue 30 and increments the count of the counter 16 by three, the number of threads in the second thread group, with the result that the count value is 3. Since the threads of the second thread group are already listed in the scheduling array 20, the assignment list generating unit 12 marks the processor numbers 1, 2 and 4 to which the threads th2a, th2b and th2c are assigned, as shown in FIG. 20C.

The assignment list generating unit 12 then retrieves the fourth primary thread pth4, the next entry in the ready queue 30, and increments the count of the counter 16 by one, the number of threads in the fourth thread group, with the result that the counter value is 4. Since the thread of the fourth thread group is not listed in the scheduling array 20, the assignment list generating unit 12 appends the fourth primary thread pth4 to the assignment list 18.

Since the count of the counter 16 has reached 4, the total number of processors, the thread assigning unit 14 assigns the thread th4a of the fourth thread group listed in the assignment list 18 to the processor number 3 not marked in the scheduling array 20.

It will be assumed that the thread th2a of the second thread group is terminated at time t3. With this, the second primary thread pth2 is removed from the ready queue 30.

As shown in FIG. 21B, the assignment list generating unit 12 retrieves the fourth primary thread pth4 at the head of the ready queue 30 and increments the count of the counter 16 by one, the number of threads in the fourth thread group, with the result that the counter value is 1. Since the thread of the fourth thread group is already listed in the scheduling array 20, the assignment list generating unit 12 marks the processor number 3 to which the thread th4a of the fourth thread group is assigned, as shown in FIG. 21C.

The assignment list generating unit 12 retrieves the fifth primary thread pth5, the next entry in the ready queue 30, and increments the count of the counter 16 by three, the number of threads in the fifth thread group, with the result that the counter value is 4. Since the threads in the fifth thread group are not listed in the scheduling array 20, the fifth primary thread pth5 is appended to the assignment list 18.

Since the count of the counter 16 has reached 4, the total number of processors, the thread assigning unit 14 assigns the threads th5a, th5b and th5c of the fifth thread group listed in the assignment list 18 to the processor numbers 1, 2 and 4, respectively, not marked in the scheduling array 20, as shown in FIG. 21C.

Figure 22:
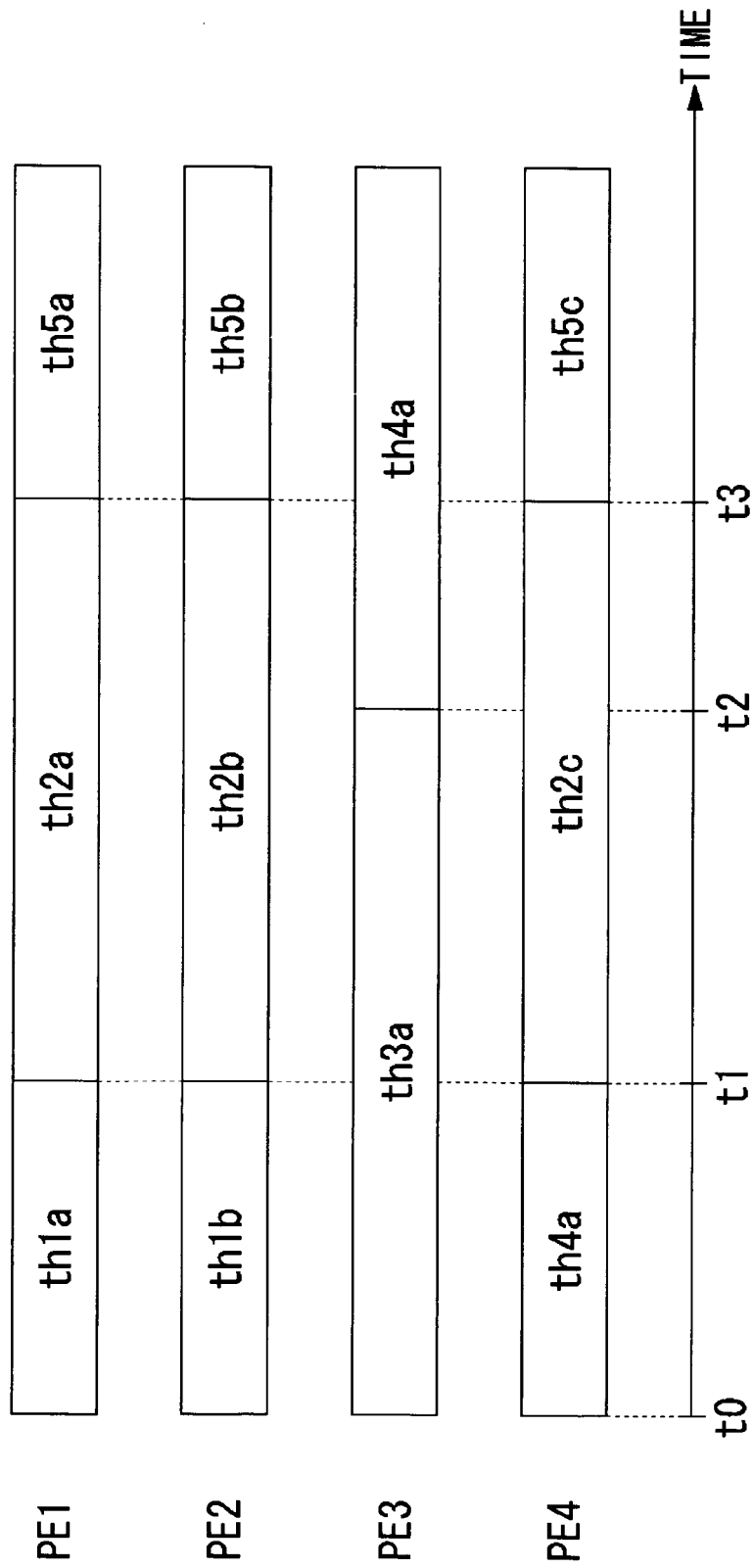
FIG. 22 shows time-dependent variation of thread assignment status according to the thread scheduling of FIGS. 18A-18C, 19A-19C, 20A-20C and 21A-21C.

FIG. 22 shows time-dependent variation of thread assignment status in this example. At time t0, the two threads th1a and th1b of the first thread group are assigned to the first processor and the second processor, respectively. The thread th3a of the third group is assigned to the third processor. The thread th4a of the fourth thread group is assigned to the fourth processor.

At time t1, rescheduling is initiated since the first thread group is placed in the waiting state. Then, the three threads th2a, th2b and th2c of the second thread group with the highest priority at that point of time are assigned. Thus, the thread th4a of the fourth thread group, which had been assigned to the fourth processor and which is lower in priority, is preempted. Meanwhile, when the third thread group is terminated at time t2, the thread th4a of the fourth thread group is assigned to the third processor instead. When the second thread group is terminated at time t3, the threads th5a, th5b and th5c of the fifth thread group are instead assigned to the first, second and fourth processors, respectively.

As described above, according to the scheduling apparatus 200 of the first embodiment, a plurality of threads belonging to a given thread group are capable of referring to each other's address spaces and performing exclusive control of a memory efficiently. This is achieved by organizing threads into groups, assigning the threads to the respective processors at the same time for execution, and taking advantage of the arrangement for synchronization and exclusive control in a multiprocessor system. Since the threads in a thread group are simultaneously assigned to the respective processors, communication between threads and sharing of a memory can be performed efficiently.

If, hypothetically, some of the plurality of threads belonging to the same thread group are assigned to processors and some are not assigned to processors so that the context of the unassigned threads are saved in a main memory, a need arises to determine where the thread entity is currently located. This necessitates a query issued to the kernel and reading of data by system call. A processing arrangement for processing all this would be complicated and costly. However, the first embodiment guarantees that, when a thread is run on a processor, the other threads in the same thread group are also run on other processors. Accordingly, processing efficiency is improved.

According to the thread scheduling of the first embodiment, threads higher in priority are given priority to the possible extent and the use efficiency of multiprocessor resources are maximized, under the condition that all threads belonging to the same thread group are assigned to the respective processors at the same time. In order to assign a thread of a thread group higher in priority, a previously assigned thread lower in priority is preempted. The order of priority is observed by preemption. If a thread group cannot be assigned due to the constraint derived from the total number of processors, a thread group lower in priority is given priority, causing inversion in the order of priority. The use efficiency of processors is improved by allowing inversion in the order of priority.

In the ready queue 30 of the first embodiment, not only thread groups in the ready state but also thread groups in the running state are queued in the order of priority and, within the same priority level, in the FIFO order. This enables scheduling in which the FIFO order of thread groups is observed. If, hypothetically, thread groups in the running state are removed from the ready queue 30, the FIFO order needs to be separately stored in order to preserve the FIFO order. This requires a complicated process and causes efficiency losses. In contrast, according to the first embodiment, thread groups in the running state are also held in the ready queue in the FIFO order so that assignment can be performed in an integral manner, observing the FIFO order. Accordingly, assignment is processed with high efficiency and requires a simple process.

In further accordance with the first embodiment, by allowing the assignment list generating unit 12 to perform a marking process in the scheduling array 20, it is guaranteed that each of threads already assigned is not reassigned to another processor, a different assignment destination. When threads in the running state continue to be scheduled for execution, those threads continue to be executed in the same processors respectively. Accordingly, the process for assignment of the threads to the respective processors is omitted so that processing efficiency is improved.

Second Embodiment

A multiprocessor system according to a second embodiment is of the same structure as the multiprocessor of FIG. 1. By thread scheduling, one thread is assigned to one of the processors 130 at a given point of time. A plurality of threads are executed in parallel in the multiprocessor system as a whole.

A difference from the first embodiment is that, in the multiprocessor system of the second embodiment, at least one of a plurality of processors 130 is not subject to thread scheduling. Threads are assigned to the remaining processors 130 by thread scheduling.

In the first embodiment, a thread group including at least one thread is defined so that scheduling is performed in units of thread groups. In the second embodiment, a thread group is not defined and scheduling is performed in units of threads. The assignment of threads to processors may be controlled in the order of priority and, within the same priority level, in the FIFO order, as described in the first embodiment. Alternatively, ordinary round-robin scheduling or priority scheduling may be employed for thread scheduling.

An execution entity that exclusively uses the resources of a host processing element 100 is run on a processor 130 of a processing element 100 not eligible for thread assignment (hereinafter, referred to as an assignment-free PE). Since the execution entity is not subject to scheduling, assignment to a processor is not preempted once it occurred. Hereinafter, the execution entity which is run on the assignment-free PE and which is not subject to scheduling will be referred to as non-scheduled execution entity.

The non-scheduled execution entity can avail itself to exclusive use of all resources in the assignment-free PE including the local memory 140 and the internal registers in the memory controller 150. This is equivalent to the exclusive use, by a thread which is assigned to a processing element 100 by thread scheduling, of all resources in the processing element 100 including the local memory 140 and the internal registers in the memory controller 150. Apart from some critical resources to which access is not permitted, most of the resources exclusively used by the non-scheduled execution entity are mapped to an address space to permit external access or access from the other processing elements 100.

Figure 23:
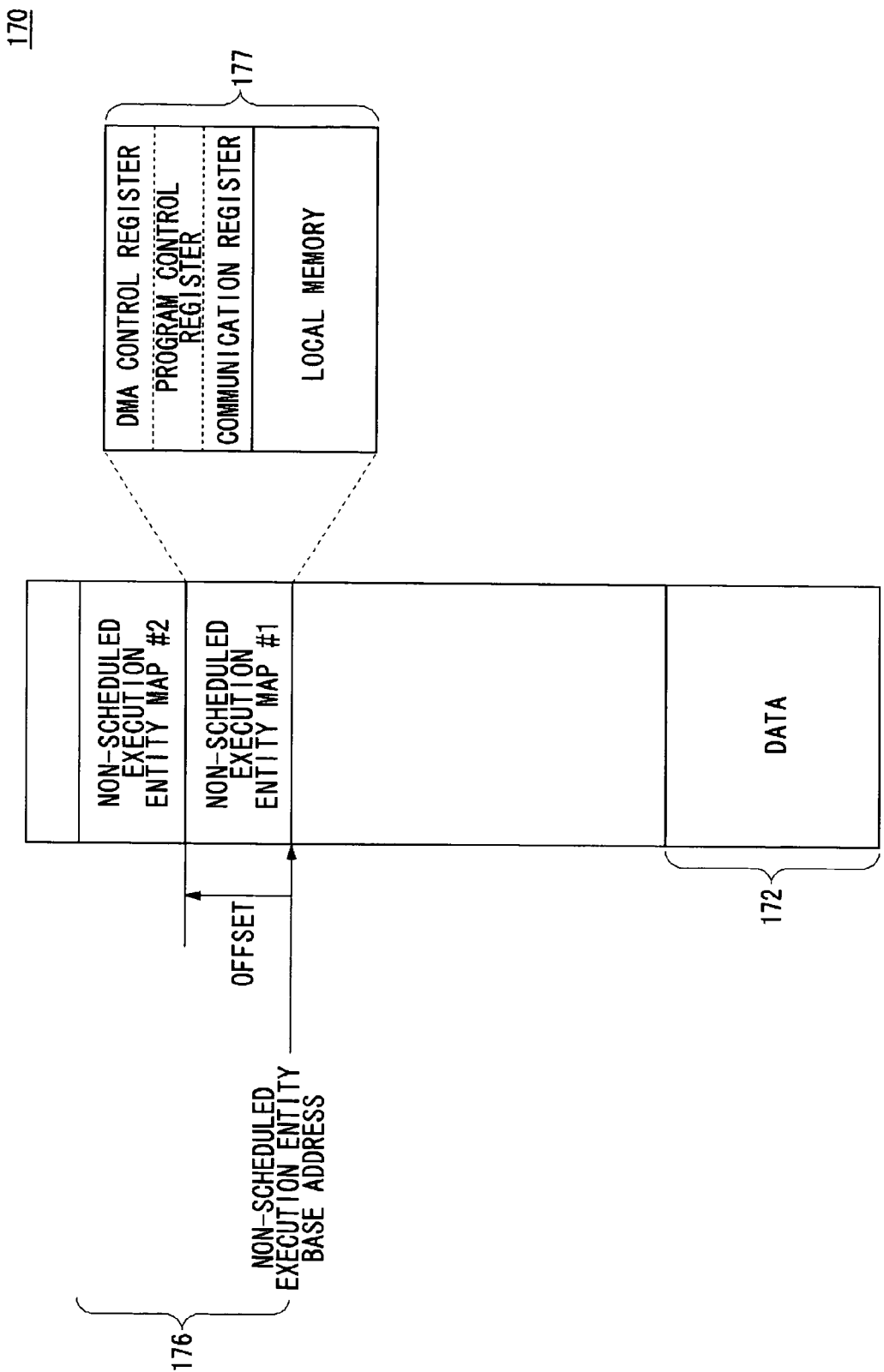
FIG. 23 shows an address space as viewed from a thread assigned to a processor in a multiprocessor system according to a second embodiment.

FIG. 23 shows an address space 170 as viewed from a thread assigned to a processor 130. The resources exclusively used by the non-scheduled execution entity being run on the assignment-free PE in the time domain are memory-mapped to the address spaces 170 of the threads run on the other processing elements 100. The address space 170 includes a main memory area 172 to which the main memory including shared data is mapped and a non-scheduled execution entity map area 176 to which the resources exclusively used by the non-scheduled execution entity are mapped.

In the illustrated example, two non-scheduled execution entity maps #1 and #2 are provided in the non-scheduled execution entity map area 176. That is, in this example, two processing elements 100 are selected as assignment-free PEs. A non-scheduled execution entity is being run on each assignment-free PE. Each of the non-scheduled execution entity maps #1 and #2 is a memory map of the resources exclusively used by a corresponding non-scheduled execution entity within the host assignment-free PE. As indicated by reference numeral 177, the map includes the local memory and a register group for externally controlling the memory controller 150. The register group includes a communication register described in the first embodiment for synchronous communication, a program control register for executing or suspending a program and a DMA control register for controlling a DMA. Unlike the thread map of FIG. 2 described in the first embodiment, all these registers are accessible. By accessing these registers, the resources exclusively used by the non-scheduled execution entity are subject to direct and detailed manipulation.

The first non-scheduled execution entity map #1 starts with a non-scheduled execution entity base address and is allocated a size reserved for a non-scheduled execution entity map. The start address of the second non-scheduled execution entity map #2 is obtained by adding an offset value commensurate with the size of a non-scheduled execution entity map to the non-scheduled execution entity base address. In the illustrated example, only two non-scheduled execution entity maps #1 and #2 are provided. Generally, there are provided as many non-scheduled execution entity maps as the number of processing elements 100 which are not subject to thread scheduling and on which non-scheduled execution entities are run.

The ID returned from a generation function in generating a non-scheduled execution entity determines the number assigned to a non-scheduled execution entity map and determines which of the non-scheduled execution entity maps in the address space 170 is used by the generated non-scheduled execution entity. The memory controller 150 of each processing element 100 holds the identity of the non-scheduled execution entity maps respectively used by the non-scheduled execution entities, as configuration information for the non-scheduled execution entity maps. The memory controller 150 of each processing element 100 can have the knowledge of non-scheduled execution entity maps that are destinations of memory-mapping of the resources of the respective non-scheduled execution entities, by referring to the configuration information of the non-scheduled execution entity maps. The memory controller 150 is capable of processing, by DMA, requests for accessing the resources of the non-scheduled execution entities, by referring to the non-scheduled execution entity maps in the address space 170.

For example, it will be assumed that the first and second processors are freed from thread scheduling at the time of initializing the system, the first non-scheduled execution entity R1 is run on the first processor and the second non-scheduled execution entity is run on the second processor. Threads are assigned to the third and fourth processors by scheduling.

In generating the first and second non-scheduled execution entities, the resources of the first non-scheduled execution entity R1 are memory-mapped to a first area ER1 of the address space of each of threads, and the resources of the second non-scheduled execution entity R2 are memory-mapped to a second area ER2. The first thread A1 is assigned to the third processor and the second thread A2 is assigned to the fourth processor by thread scheduling.

When the first thread A1 being run on the third processor accesses the first area ER1 or the non-scheduled execution entity map of the first non-scheduled execution entity R1, the resources of the first processor are referred to as the resources of the first non-scheduled execution entity R1. Access from the first thread A1 to the first area ER1 or the non-scheduled execution entity map of the first non-scheduled execution entity R1 is guaranteed to be access to the resources of the first non-scheduled execution entity regardless of which processor is running the first non-scheduled execution entity R1. This is similarly true of access from the first thread A1 to the second area ER2 or the non-scheduled execution entity map of the second non-scheduled execution entity R2.

It is also similarly true of access from the second thread A2 being run on the fourth processor to the first area ER1 and the second area ER2, i.e., the non-scheduled execution entity maps of the first and second non-scheduled execution entities R1 and R2.

As described, a thread assigned to any of the processors 130 can gain direct DMA access to the resources exclusively used by a non-scheduled execution entity, by accessing the address of a non-scheduled execution entity map set up in the address space 170.

By allowing a thread to access the resources exclusively used by a non-scheduled execution entity memory-mapped to an address space, the hardware resources of the processor on which the non-scheduled execution entity is run can be directly manipulated without using a system call. Since most of the resources exclusively used by the non-scheduling execution entity are mapped to the address space referred to by the thread, the control of much of the hardware resources is subject to user management. For example, a program may be executed or suspended externally.

The arrangement for synchronization described in the first embodiment is also useful in the second embodiment. By allowing a thread to write values in the communication register in the memory controller 150, which is one of the resources of a non-scheduled execution entity memory-mapped to an address space and allowing the non-scheduled execution entity to wait for the completion of writing in the communication register, synchronization between the non-scheduled execution entity and the thread is achieved.

In an alternative use of the non-scheduled execution entity, the resources exclusively used by the non-scheduled execution entity may be memory-mapped to the memory space of a device such as a graphics display apparatus so as to achieve an arrangement for synchronization between the processing element 100 on which the non-scheduled execution entity runs and the graphics display apparatus, using the resources exclusively used by the non-scheduled execution entity.

Third Embodiment

In the multiprocessor system according to the second embodiment, a thread group is not defined. Alternatively, threads may be organized into groups as in the first embodiment so that scheduling is performed in units of thread groups. A multiprocessor system according to a third embodiment is a modification of the multiprocessor according to the first embodiment by employing the method described in the second embodiment of memory-mapping the resources exclusively used by a non-scheduled execution entity to an address space.

The multiprocessor system according to the third embodiment is similar to the system of the second embodiment in that at least one of the plurality of processors 130 is free from thread scheduling and threads are assigned to the remaining processors 130 by thread scheduling. Similarly also to the system of the first embodiment, the multiprocessor system according to the third embodiment is configured such that a thread group including at least one thread is defined so that scheduling is performed in units of thread groups. The description of the structure and operation that are common to the first and second embodiments will be omitted and only the structure and operation that differ from those of the earlier embodiments will be described.

Figure 24:
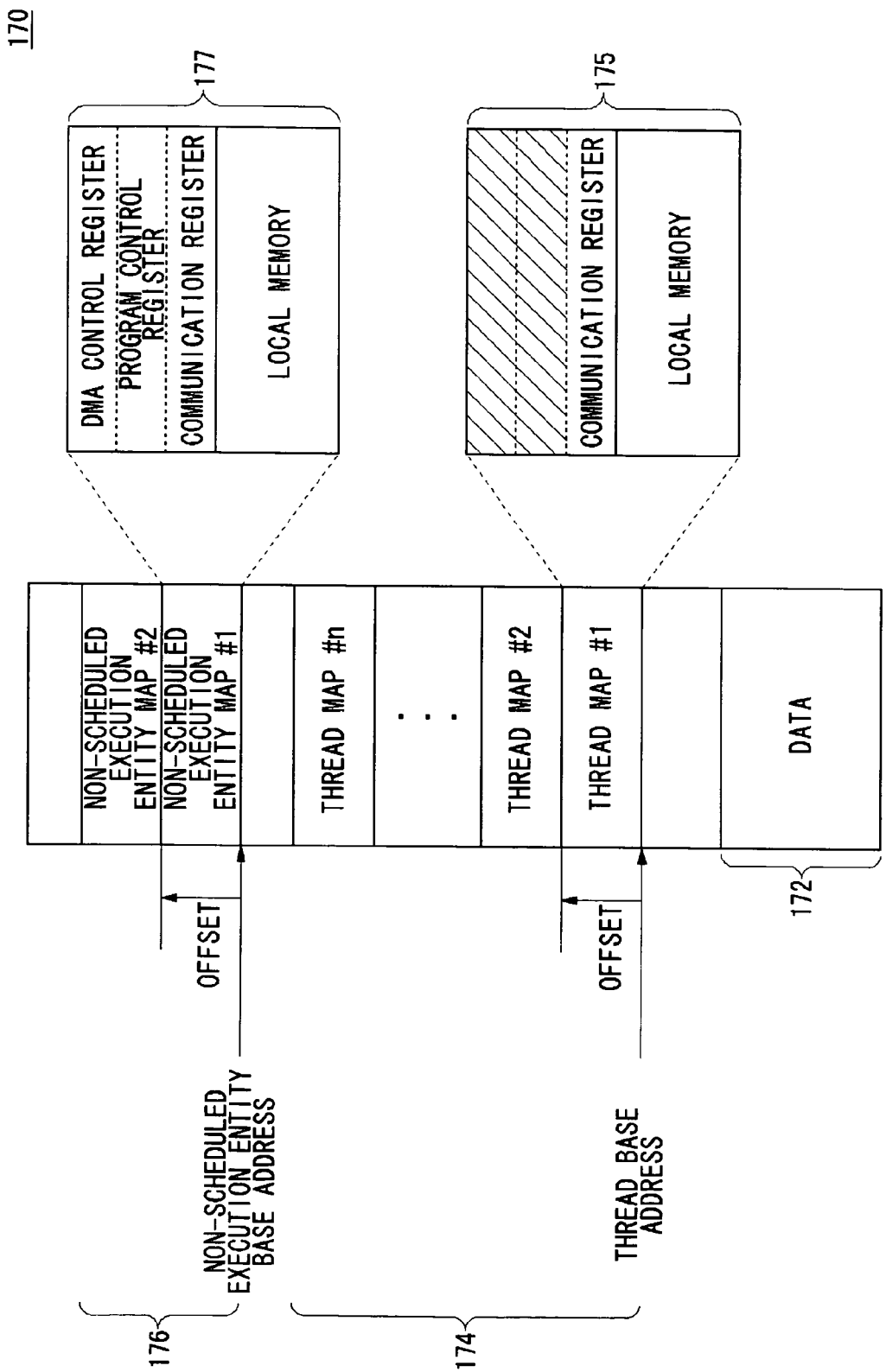
FIG. 24 shows an address space as viewed from a thread assigned to a processor in a multiprocessor system according to a third embodiment.

FIG. 24 shows an address space 170 as viewed from a thread assigned to one of the processors 130. The address space 170 contains a main memory area 172 to which the main memory including shared data is mapped, a thread map area 174 to which the resources exclusively used by the threads in the same group are mapped and a non-scheduled execution entity map area 176 to which the resources exclusively used by non-scheduled execution entities are mapped.

The thread map area 174 is as described in the first embodiment and the non-scheduled execution entity map area 176 is as described in the second embodiment. The resources included in each thread map indicated by reference numeral 175 differ from the resources included in a non-scheduled execution entity map indicated by reference numeral 177 in that access to some of the resources included in the thread map is not permitted. However, the types of mapped resources are the same in both maps. Therefore, both maps are of the same size and the same offset value with respect to the start address.

The thread map area 174 is set up for an address space of each of the threads belonging to the same group. A thread map cannot be referred to from a thread belonging to a different group. In contrast, the non-scheduled execution entity map area 176 is provided as a fixed area that does not depend on the group to which the thread belongs to. As such, the non-scheduled execution entity map area 176 remains available for reference at the same address. Since the non-scheduled execution entity map area 176 is not saved in the main memory 120, it can be referred to at any time in an address space of a thread.

Figure 25:
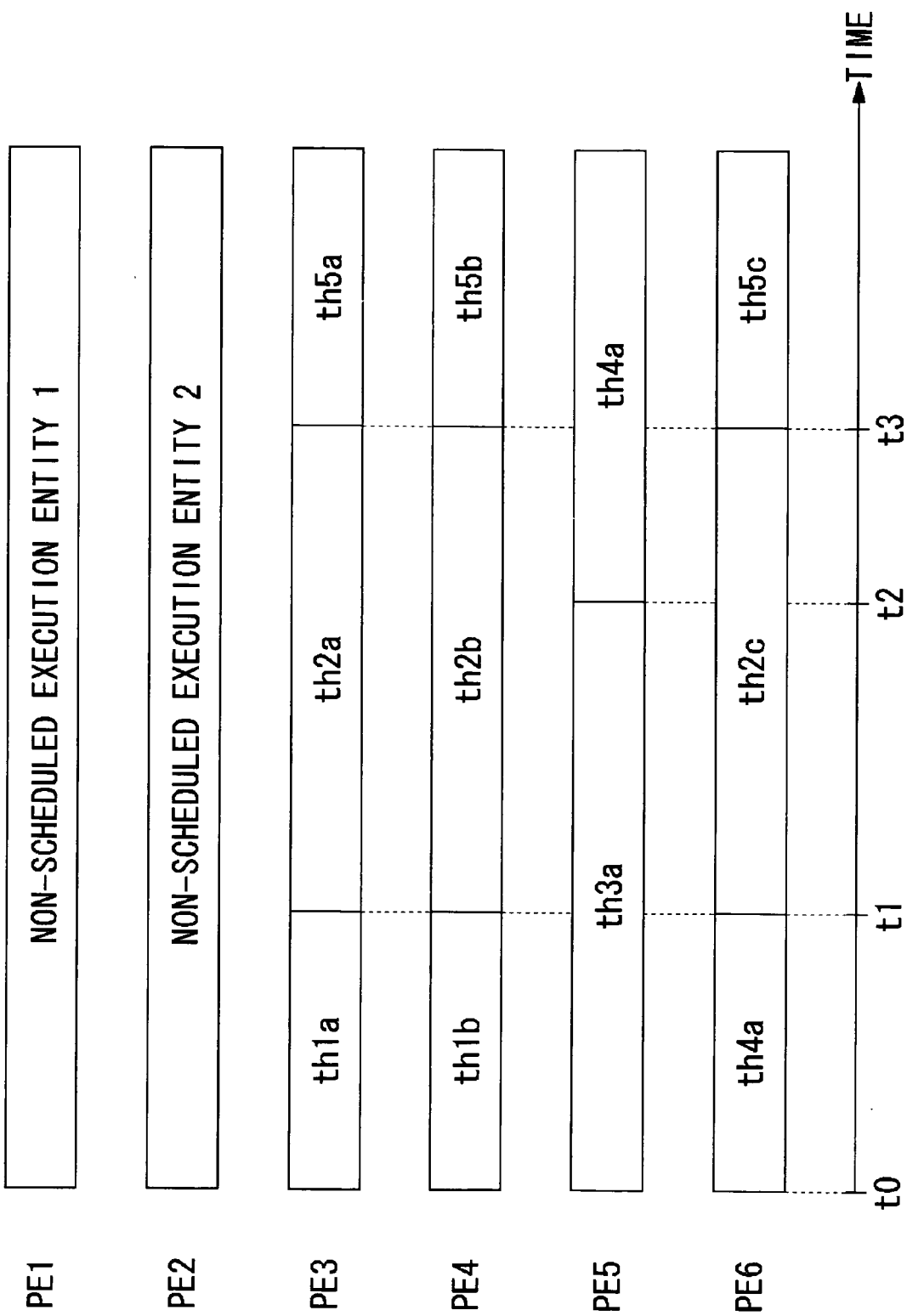
FIG. 25 shows time-dependent variation of thread assignment status according to the thread scheduling in a multiprocessor system according to a third embodiment.

FIG. 25 shows time-dependent variation of thread assignment status according to the thread scheduling of the third embodiment. In this example, the first and second processors are selected as assignment-free PEs. Threads are assigned to the remaining third through sixth processors by scheduling.

The first non-scheduled execution entity is run on the first processor and the second non-scheduled execution entity is run on the second processor. Since these non-scheduled execution entity are not subject to scheduling, they continue to exclusively use the respective processors in the domain until deleted.

Threads are scheduled and assigned to the third through sixth processors in units of thread groups according to the scheduling method of the first embodiment described with reference to FIG. 22.

If the non-scheduled execution entity is deleted and its assignment to the processor is canceled, the processor may be enlisted for thread assignment. For example, when the second non-scheduled execution entity is deleted so as to release the second processor, the second processor may be enlisted for thread assignment when scheduling is performed next time so that threads may be assigned to the second through sixth processors by scheduling.

Described above is an explanation based on the embodiments. The embodiments are only illustrative in nature and it will be obvious to those skilled in the art that variations in constituting elements and processes are possible within the scope of the present invention.

In the embodiments, a symmetric multiprocessor system, in which all processing elements are of the same structure, is given as an example. The multiprocessor system is configured such that one of the processing elements is provided with the function of thread management and scheduling. Alternatively, an inventive multiprocessor system may be a nonsymmetric multiprocessor system that includes a managing processing element provided with the function of thread management and scheduling. In still another alternative system, the scheduling function may be implemented as part of an operating system (OS) or as one of the processes run on the OS.

In the illustrative description, thread scheduling in which threads generated inside a process are units of parallel processing. The present invention is equally applicable to process scheduling in which processes are units of parallel processing.

What is claimed is:

1. A scheduling method for a multiprocessor system for scheduling the order of assignment of execution units processed in parallel and subject to scheduling to a plurality of processors, comprising:

organizing at least one execution unit subject to scheduling into at least one group;

mapping processor resources, exclusively used by each of the execution units belonging to the same group, to an address space referred to by the execution units so that the execution units can refer to each other's resources;

sequentially retrieving at least one group, each including at least one execution unit subject to scheduling, from a ready queue, the ready queue storing groups in a ready state;

referring to a schedule table which holds execution units in relation to processors to which the execution units are assigned;

setting up flags for the processors to which the execution units are assigned, when the execution units belonging to a group retrieved from the ready queue are listed in the schedule table;

appending the retrieved group to an assignment list storing groups that are candidates for assignment to respective processors, when the execution units belonging to the retrieved group are not listed in the schedule table and when all execution units belonging to the retrieved group are assignable to the respective processors at the same time; and assigning all execution units belonging to the groups stored in the assignment list to the respective processors for which flags are not set up in the schedule table.

2. The scheduling method according to claim 1, wherein the assignment of groups sequentially retrieved from the ready queue to respective processors is repeated until the number of execution units assigned to respective processors reaches the total number of processors or until the group at the end of the ready queue is retrieved.

3. The scheduling method according to claim 1, wherein, when each of the execution units belonging to a group at the head of the groups sequentially retrieved from the ready queue is already assigned to a processor and is being executed, the assignment of each of the execution units being executed to a processor is preserved so that the execution unit being executed is prevented from being reassigned to another processor, a different assignment destination.

4. The scheduling method according to claim 1, further comprising:
freeing at least one of the plurality of processors from scheduling for assignment of at least one execution unit;
mapping processor resources, exclusively used by an execution unit which is run on a processor free from assignment and which is not subject to scheduling, to an address space referred to by the execution units so that an execution unit subject to scheduling can refer to the resources, and accordingly controlling the assignment of execution units to processors enlisted for assignment.

5. A scheduling apparatus for a multiprocessor for scheduling the order of assignment of execution units processed in parallel and subject to scheduling to a plurality of processors, comprising:
a memory controller which organizes at least one execution units subject to scheduling into at least one group and which maps processor resources, exclusively used by each of the execution units belonging to the same group, to an address space referred to by the execution units and manages the resources so that the execution units can refer to each other's resources;
a ready queue which stores groups in a ready state;
an assignment list generating unit which sequentially retrieves the groups at least one group in the ready queue and which appends the retrieved group to an assignment list storing groups that are candidates for assignment to respective processors only when all execution units belonging to the retrieved group are assignable to the respective groups at the same time;
an assignment unit which assigns all execution units belonging to the group stored in the assignment list generated by the assignment list generating unit to a plurality of processors; and
a schedule table which holds execution units in relation to processors to which the execution units are assigned;
when the execution units belonging to a group retrieved from the ready queue are listed in the schedule table, the assignment list generating unit sets up flags for the processors to which the execution units are assigned,
when the execution units belonging to the retrieved group are not listed in the schedule table and when all execution units belonging to the retrieved group are assignable to the respective processors at the same time, the assignment list generating unit appends the retrieved group to the assignment list, and
the assignment unit assigns all execution units belonging to the groups stored in the assignment list to the respective processors for which flags are not set up in the schedule table.

6. The scheduling apparatus according to claim 5, wherein the apparatus determines a destination area in the address space for mapping of the resources exclusive used by each of the execution units belonging to the same group in an initialization step for organizing the execution units into groups, maintaining configuration information related to the destination of resource mapping until the group is deleted.

7. The scheduling apparatus according to claim 5, wherein the execution units belonging to the same group and assigned by the assignment unit to the respective processors at the same time include a first execution unit and a second execution unit, and data is delivered from the first execution unit to the second execution unit within the same group by allowing the first execution unit to write the data in a resource area for the second execution unit mapped to the address space.

8. The scheduling apparatus according to claim 5, wherein the execution units belonging to the same group and assigned by the assignment unit to the respective processors at the same time include a first execution unit and a second execution unit, and synchronization between the first execution unit and the second execution unit within the same group is achieved by allowing the first execution unit to write data in a resource area for the second execution unit mapped to the address space and allowing the second execution unit to wait until the writing of the data in the resource area is completed.

9. The scheduling apparatus according to claim 5, wherein:
the memory controller frees at least one of the plurality of processors from scheduling for assignment of at least one execution unit, maps processor resources, exclusively used by an execution unit which is run on a processor free from assignment and which is not subject to scheduling, to an address space referred to by an execution unit subject to scheduling so that the execution unit subject to scheduling can refer to the resources, and manages the resources accordingly.

10. The scheduling apparatus according to claim 9, wherein a destination area of mapping the processor resources exclusively used by an execution unit, which is run on a processor free from assignment and which is not subject to scheduling, to the address space is fixed at the same address as viewed from any execution unit subject to scheduling.

11. The scheduling apparatus according to claim 9, wherein the resources of a processor free from assignment are directly controlled by allowing an execution unit, which is subject to scheduling and assigned by the assignment unit to one of the processors, to write data in a resource area, mapped to the address space, of an execution unit which is run on the processor free from assignment and which is not subject to scheduling.

12. The scheduling apparatus according to claim 9, wherein synchronization between an execution unit subject to scheduling and an execution unit not subject to scheduling is achieved by allowing the execution unit, which is subject to scheduling and assigned by the assigning unit to one of the processors, to write data in a resource area, mapped to the address space, of the execution unit which is run on a processor free from assignment and which is not subject to scheduling, and by allowing the execution unit, which is run on the processor free from assignment and which is not subject to scheduling, to wait until the writing of the data in the resource area is completed.

13. A multiprocessor system in which execution units processed in parallel and subject to scheduling are assigned to a plurality of processors for parallel execution, wherein
one of the processors includes a scheduler for assigning the execution units subject to scheduling to the rest of the plurality of processors, the scheduler comprising:
a memory controller which organizes at least one execution unit subject to scheduling into at least one group and which maps processor resources, exclusively used by each of the execution units belonging to the same group, to an address space referred to by the execution units and manages the resources so that the execution units can refer to each other's resources;

a ready queue which stores groups in a ready state; and an assignment list generating unit which sequentially retrieves at least one group in the ready queue and which appends the retrieved group to an assignment list storing groups that are candidates for assignment to respective processors only when all execution units belonging to the retrieved group are assignable to the respective groups at the same time;

an assignment unit which assigns all execution units belonging to the group stored in the assignment list generated by the assignment list generating unit to a plurality of processors; and a schedule table which holds execution units in relation to processors to which the execution units are assigned;

when the execution units belonging to a group retrieved from the ready queue are listed in the schedule table, the assignment list generating unit sets up flags for the processors to which the execution units are assigned, when the execution units belonging to the retrieved group are not listed in the schedule table and when all execution units belonging to the retrieved group are assignable to the respective processors at the same time, the assignment list generating unit appends the retrieved group to the assignment list, and the assignment unit assigns all execution units belonging to the groups stored in the assignment list to the respective processors for which flags are not set up in the schedule table.

* * * * *